United States Patent
Hosman et al.

(10) Patent No.: US 11,078,301 B2
(45) Date of Patent: Aug. 3, 2021

(54) HIGH PRESSURE, FREE RADICAL POLYMERIZATIONS TO PRODUCE ETHYLENE-BASED POLYMERS

(71) Applicant: Dow Global Technologies LLC, Midland, MI (US)

(72) Inventors: Cornelis J F Hosman, Terneuzen (NL); Nhi T. Y. Dang, Terneuzen (NL); Otto J. Berbee, Terneuzen (NL); Joaquin Flores, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 127 days.

(21) Appl. No.: 16/302,806

(22) PCT Filed: Jun. 22, 2017

(86) PCT No.: PCT/US2017/038771
§ 371 (c)(1),
(2) Date: Nov. 19, 2018

(87) PCT Pub. No.: WO2017/223324
PCT Pub. Date: Dec. 28, 2017

(65) Prior Publication Data
US 2019/0292279 A1    Sep. 26, 2019

(30) Foreign Application Priority Data
Jun. 24, 2016    (EP) .................................... 16382298

(51) Int. Cl.
*C08F 2/34* (2006.01)
*B01J 12/00* (2006.01)
(Continued)

(52) U.S. Cl.
CPC ................ *C08F 2/34* (2013.01); *A46B 11/06* (2013.01); *B01J 3/02* (2013.01); *B01J 3/042* (2013.01);
(Continued)

(58) Field of Classification Search
USPC ...................... 526/64, 87, 918, 920; 422/134
See application file for complete search history.

(56) References Cited

U.S. PATENT DOCUMENTS

| | | |
|---|---|---|
| 3,558,010 A | 1/1971 | Zenger |
| 4,135,044 A | 1/1979 | Beals |

(Continued)

FOREIGN PATENT DOCUMENTS

| | | |
|---|---|---|
| DE | 276598 A3 | 3/1999 |
| EP | 2636689 A1 | 9/2013 |

(Continued)

OTHER PUBLICATIONS

Extended European Search Report pertaining to European Patent Application No. 15382554.2 dated May 3, 2016.

(Continued)

*Primary Examiner* — Fred M Teskin
(74) *Attorney, Agent, or Firm* — Dinsmore & Shohl LLP

(57) ABSTRACT

A high pressure polymerization, as described herein, to form an ethylene-based polymer, comprising the following steps: polymerizing a reaction mixture comprising ethylene, using a reactor system comprising at least three ethylene-based feed streams and a reactor configuration that comprises at least four reaction zones, and at least one of the following a) through c), is met: (a) up to 100 wt % of the ethylene stream to the first zone comes from a high pressure recycle, and/or up to 100 wt % of the last ethylene stream to a zone comes from the output from a Primary compressor system; and/or (b) up to 100 wt % of the ethylene stream to first zone comes (Continued)

from the output from a Primary compressor system, and/or up to 100 wt % of the last ethylene stream to a zone comes from a high pressure recycle; and/or (c) the ethylene stream to the first zone, and/or the last ethylene stream to a zone, each comprises a controlled composition; and wherein each ethylene stream to a zone receives an output from two or more cylinders of the last compressor stage of a Hyper compressor system.

8 Claims, 5 Drawing Sheets

(51) Int. Cl.
    *C08F 2/01*     (2006.01)
    *B01J 3/02*     (2006.01)
    *B01J 3/04*     (2006.01)
    *C08F 6/00*     (2006.01)
    *C08F 10/02*     (2006.01)
    *A46B 11/06*     (2006.01)
    *B05C 17/005*     (2006.01)
    *C08F 2/00*     (2006.01)
    *C08F 210/02*     (2006.01)

(52) U.S. Cl.
    CPC .............. *B01J 3/046* (2013.01); *B01J 12/00* (2013.01); *B05C 17/00503* (2013.01); *B05C 17/00569* (2013.01); *B05C 17/00573* (2013.01); *C08F 2/00* (2013.01); *C08F 2/01* (2013.01); *C08F 6/001* (2013.01); *C08F 10/02* (2013.01); *C08F 210/02* (2013.01); *B01J 2203/06* (2013.01); *Y02P 20/582* (2015.11)

(56) References Cited

U.S. PATENT DOCUMENTS

| | | | |
|---|---|---|---|
| 4,611,941 A | 9/1986 | Karliner et al. | |
| 4,822,194 A | 4/1989 | Simonette | |
| 5,257,508 A | 11/1993 | Powell et al. | |
| 5,844,045 A | 12/1998 | Kolthammer et al. | |
| 5,869,575 A | 2/1999 | Kolthammer et al. | |
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 6,673,878 B2 | 1/2004 | Donck | |
| 6,899,852 B2 | 5/2005 | Donck | |
| 7,563,413 B2 | 7/2009 | Naets et al. | |
| 7,582,709 B2 | 9/2009 | Goossens et al. | |
| 7,745,550 B2 | 6/2010 | Donck et al. | |
| 8,273,835 B2 | 9/2012 | Littmann et al. | |
| 8,415,442 B2 | 4/2013 | Karjala et al. | |
| 8,445,606 B2 | 5/2013 | Lammens et al. | |
| 8,822,601 B2 | 9/2014 | Karjala et al. | |
| 8,871,876 B2 | 10/2014 | Berbee et al. | |
| 8,906,312 B2 | 12/2014 | Clymans | |
| 9,120,880 B2 | 9/2015 | Zschoch et al. | |
| 9,228,036 B2 | 1/2016 | Berbee et al. | |
| 9,234,055 B2 | 1/2016 | Berbee et al. | |
| 9,809,701 B2 | 11/2017 | den Doelder et al. | |
| 9,828,496 B2 | 11/2017 | den Doelder et al. | |
| 2003/0206835 A1 | 11/2003 | Donck | |
| 2007/0032614 A1 | 2/2007 | Goossens et al. | |
| 2011/0294967 A1 | 12/2011 | Littmann et al. | |
| 2016/0137822 A1 | 5/2016 | den Doelder et al. | |

FOREIGN PATENT DOCUMENTS

| | | |
|---|---|---|
| EP | 3168237 A1 | 5/2017 |
| EP | 3168238 A1 | 5/2017 |
| EP | 3168239 A1 | 5/2017 |
| GB | 1370101 A | 10/1974 |
| JP | 2006233059 A | 9/2006 |
| WO | 0168723 A2 | 9/2001 |
| WO | 0214379 A1 | 2/2002 |
| WO | 2006094723 A1 | 9/2006 |
| WO | 2012044504 A1 | 4/2012 |
| WO | 2012117039 A1 | 9/2012 |
| WO | 2013059042 A1 | 4/2013 |
| WO | 2014190041 A1 | 11/2014 |
| WO | 2015166297 A1 | 11/2015 |
| WO | 2016109266 A1 | 7/2016 |
| WO | 2016210235 A1 | 12/2016 |
| WO | 2017058570 A1 | 4/2017 |
| WO | 2017083552 A1 | 5/2017 |
| WO | 2017083559 A1 | 5/2017 |
| WO | 2017083563 A1 | 5/2017 |
| WO | 2017146981 A1 | 8/2017 |
| WO | 2017201110 A1 | 11/2017 |

OTHER PUBLICATIONS

International Search Report and Written Opinion pertaining to PCT/US2016/061390 dated Jan. 25, 2017.
International Search Report and Written Opinion pertaining to PCT/US2015/066860 dated Mar. 29, 2016.
Extended European Search Report pertaining to European Patent Application No. 16382298.4 dated Oct. 24, 2016.
International Search Report and Written Opinion pertaining to PCT/US2017/038771 dated Aug. 24, 2017.
Goto et al., "Computer Model for Commercial High-Pressure Polyethylene Reactor Based on Elementary Reaction Rates Obtained Experimentally", J. Applied Polymer Science, 36, 21-40, 1981.
Luft, Gerhard, Chem.-Ing.-Tech., Hochdruck-Polyaethylen, vol. 51 (1979) Nr. 10, pp. 960-969.
Ehrlich et al., "Fundamentals of the free radical polymerization of ethylene", Adv. Polymer Sci., vol. 7, 386-448 (1970).
Mortimer, G., "Chain transfer in ethylene polymerization", Journal of Polymer Science: Part A-1, vol. 4, p. 881-900 (1966).
Mortimer, G., "Chain transfer in ethylene polymerization. IV. Additional study at 1360 atm and 130° C.", Journal of Polymer Science: Part A-1, ; vol. 8, p. 1513-1523 (1970).
Mortimer, G., "Chain transfer in ethylene polymerization. Part V. The effect of temperature", Journal of Polymer Science: Part A-1, ; vol. 8, p. 1535-1542 (1970).
Mortimer, G., "Chain transfer in ethylene polymerization VII. Very reactive and depletable transfer agents", Journal of Polymer Science: Part A-1, , vol. 10, p. 163-168 (1972).
Yamamoto et al., "Rate Constant for Long-Chain Branch Formation in Free-Radical Polymerization of Ethylene", J. Macromol. Science-Chem. 1979, 1067.
Maggi et al., "Enhancing the Design of Hyper Compressors and Related LDPE Plants Components", GE Oil & Gas, 2015.
Giacomelli et al., "Preliminary Pulsation Analysis for High Pressure Piping Size Evaluation for Hyper-Compressors for LDPE Plants", Proceedings of PVP 2006, Pressure Vessels and Piping, Jul. 23-27, 2006, Vancouver, BC, Canada.
Office Action pertaining to corresponding Chinese Patent Application No. 201780034748.5, dated Sep. 18, 2020.
Notice of Allowance and Fee(s) Due dated Jul. 31, 2019 pertaining to U.S. Appl. No. 15/769,296, filed Apr. 18, 2018, 18 pgs.
Search Report pertaining to corresponding Brazilian Patent Application No. BR112018074785-8, dated May 5, 2021.

HIGH PRESSURE, FREE RADICAL POLYMERIZATIONS TO PRODUCE ETHYLENE-BASED POLYMERS

REFERENCE TO RELATED APPLICATIONS

This application is a National Stage Entry under 35 U.S.C. § 371 of International Patent Application No. PCT/US2017/038771, filed Jun. 22, 2017, which claims priority to European Patent Application No. 16382298.4, filed Jun. 24, 2016.

BACKGROUND OF INVENTION

Low Density Polyethylene (LDPE) is produced through a high pressure free radical polymerization process. The polymerization is carried under pressure conditions exceeding a pressure level of 1000 bar. These high operating pressures demands require specialized high pressure pumps and compressors of a reciprocating nature. A secondary compressor system can consist of a single or multiple compressor frames driven by a single or multiple (electrical) motors. Due to the reciprocating nature of a plunger compressor, each cylinder gives, per turn of the crankshaft, an unsteady and pulse-wise flow, resulting in pulsation and potentially vibration at the discharge section of the compression stage. The pulsation and vibration level at this discharge section can be reduced, and managed, through one or more of the following: a) combining cylinder outputs to form a feed stream, b) phasing of the combined cylinder outputs, c) forming a feed or suction line, d) forming a lay-out, and selecting the dimensions, of discharge lines of the individual compression cylinders and the combined discharge header(s), e) positioning and sizing of orifices in the compression discharge lines and headers and other measures. It is highly recommended to perform acoustical and mechanical studies to identify measures and designs of suction, interstage and discharge systems to prevent and to reduce pulsation and vibration in and around the compression system. For example, see the following references: E. Giacomelli et al, *Proceedings of PVP* 2006 (*PVP2006-ICPVT*11-93234), *Pressure vessels and piping,* 23-27 Jul. 2006, Vancouver, BC, Canada; and C. Maggi et al; *GE Oil&Gas* (*GEA*32031(08/2015): *Enhancing the design of Hyper compressor system compressors and related LDPE plant components.*

Low Density Poly Ethylene (LDPE) is produced in an autoclave and/or tubular reactor at high pressure and temperature. High pressure, free-radical polymerizations are disclosed in the following references: U.S. Pat. Nos. 8,445,606, 4,135,044, 7,582,709, and JP050534422 (Abstract). U.S. Pat. No. 9,120,880 shows the importance of distributing the ethylene based feed flow coming from the Primary compressor over the reactor inlets for making narrow and broad MWD products at high conversion levels. The process efficiency and product capability can be further strengthened by combining the distribution of the ethylene based feed flow coming from the Primary compressor with a distribution of the CTA make-up over the inlets of the reactor. Making full utilization of the distribution of ethylene coming from the Primary compressor and distribution of the make-up CTA over the reactor system, while still maintaining maximum product design flexibility, necessitates the design of innovative secondary compressor and reactor line-ups using three or more ethylene based feed streams to the reactor. The inventive compressor and reactor line-ups allows maximization of the CTA concentration differential in the feed flows, reversal of the CTA concentration differential and flexible control of CTA concentration differential in the reactor feed flows. Furthermore the invention can be used in high pressure polymerization process with ethylene based throughputs which can range from 40 to 450 KTA or higher, while reducing and avoiding excessive pulsation and vibration levels.

SUMMARY OF THE INVENTION

In a first aspect, a high pressure polymerization process to form an ethylene-based polymer, the process comprising at least the following steps:

polymerizing a reaction mixture comprising ethylene, using a reactor system comprising at least three ethylene-based feed streams and a reactor configuration that comprises at least four reaction zones, and wherein at least one of the following distributions a) through c), is met:

(a) up to 100 wt % of the ethylene-based feed stream to the first reaction zone comes from a high pressure recycle, and/or up to 100 wt % of the last ethylene-based feed stream to a reaction zone comes from the output from a Primary compressor system; and/or (b) up to 100 wt % of the ethylene-based feed stream to first reaction zone comes from the output from a Primary compressor system, and/or up to 100 wt % of the last ethylene-based feed stream to a reaction zone comes from a high pressure recycle; and/or (c) the ethylene-based feed stream to the first reaction zone, and/or the last ethylene-based feed stream to a reaction zone, each comprises a controlled composition;

and wherein each ethylene based feed stream to a reaction zone, independently, receives an output from two or more cylinders of the last compressor stage of a Hyper compressor system;

and wherein the ethylene based feed stream to the first reaction zone is from 20 wt % to 60 wt % of the total ethylene based feed stream to the reactor configuration; and wherein the sum of the last two ethylene based feed streams to the reactor configuration is from 20 wt % to 80 wt % of the total ethylene based feed streams to the reactor configuration.

In a second aspect, a Hyper compressor system comprising at least the following components: a) at least two compressing stages; b) at least two output lines; c) at least two separate suction flows; and d) at least one interstage that comprises at least two separate interstage cooling systems; e) optionally, at least one balancing pressure line between the separate interstage cooling systems; f) optionally, at least one balancing pressure line between the separate output lines.

DESCRIPTION OF EMBODIMENTS OF THE INVENTION

Figure 1:
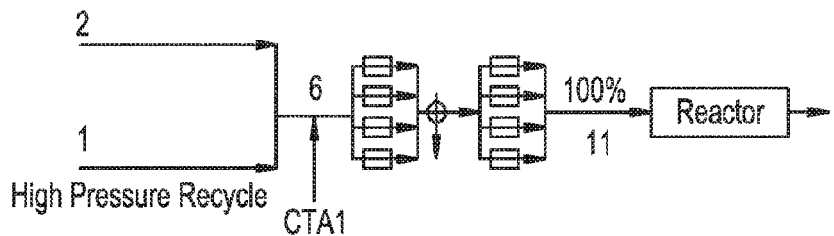
FIG. 1 is Hyper compressor system layout for All Front Gas process (CP1).

The distributions of the output of the Primary compressor system, the flow of the HPR and the make-up CTA are very important for producing polymers with either narrow or broad MWD and associated rheological properties as melt elasticity and G'. The inventive line-ups of Hyper compressor systems in regard to suction, interstage and discharge flows extends and preserves the desired capability of polymer MWD. Furthermore by combining the inventive compressor line-ups with an inventive system to control the distribution of the Primary compressor system output and the flow coming from the HPR, maximum flexibility and control in polymer MWD, between the maximum narrow and broad MWD capability, is achieved. For each Hyper compressor system design, regardless of numbers of cylinders in overall compressor system, first compression and/or subsequent compression stages an inventive compressor line-up can be defined in order to achieve maximum capability and flexibility in CTA concentration over the reactor feed streams and consequently polymer properties as MWD and rheology. Furthermore the inventive line-ups allows reduction and minimization of pulsation and vibration levels in the combined discharge lines in the compressor interstage and outlet by preferential combining opposing cylinders and/or the use of balancing lines.

In one embodiment, for the first aspect, distribution (a) is met. In one embodiment, distribution (b) is met. In one embodiment, distribution (c) is met. In one embodiment, distributions (a) and (b) are met. In one embodiment, distributions (a) and (c) are met. In one embodiment, distributions (b) and (c) are met. In one embodiment, distributions (a), (b) and (c) are met.

In one embodiment, for the first aspect, for distribution (b), ≤90 wt %, or ≤80 wt %, or ≤70 wt %, or ≤60 wt %; of the ethylene-based feed stream to first reaction zone comes from the output from a Primary compressor system, and/or up to 100 wt % of the last ethylene-based feed stream to a reaction zone comes from a high pressure recycle. In a further embodiment, distributions (b) is met, and optionally distributions (a) is met, and optionally distributions (c) is met.

In one embodiment, for the first aspect, for distribution (b), from 10 to 90 wt %, or from 20 to 80 wt %, or from 30 to 70 wt %, or from 40 to 60 wt %; of the ethylene-based feed stream to first reaction zone comes from the output from a Primary compressor system, and/or up to 100 wt % of the last ethylene-based feed stream to a reaction zone comes from a high pressure recycle. In a further embodiment, distributions (b) is met, and optionally distributions (a) is met, and optionally distributions (c) is met.

In one embodiment, for the first aspect, the reactor configuration comprises ≥5, or ≥6, or ≥7, or ≥8 reaction zones. In one embodiment, for the first aspect, the reactor system comprises at ≥4, or ≥5, or ≥6, or ≥7 ethylene-based feed streams.

In one embodiment, for the first aspect, the ethylene based feed stream to the first reaction zone is from 20 wt % to 50 wt %, or 20 wt % to 40 wt %, or 30 wt % to 40 wt % of the total ethylene based feed stream to the reactor configuration.

In one embodiment, for the first aspect, the sum of the last two ethylene based feed streams to the reactor configuration is from 30 to 80 wt %, or from 40 to 80 wt %, or from 50 to 80 wt %, or from 60 to 70 wt % of the total ethylene based feed streams to the reactor configuration.

In one embodiment, for the first aspect, the weight percent of ethylene-based feed flow from the output of the Primary compressor system, and in the feed to the first reaction zone, is varied using the smaller of range i) or range ii) as follows:

i) the ethylene-based feed flow from the output of the Primary compressor system is from 0 wt % to 100 wt %;

ii) the ethylene-based feed flow from the output of the Primary compressor system is from 0 wt %, to a value determined by the following equation:

$$\frac{[(\text{Conversion} \times A) + \text{purge}]}{X} \times 100 \text{ wt \%},$$

where A=1.25, and further 1.22, or 1.20, or 1.18, or 1.15, and wherein X is the percentage of the ethylene-based feed stream to the first reaction zone, based on the total amount of ethylene-based streams to the reactor configuration, and the "conversion (in wt %)" is the "polymer output divided by the total feed flow to the reactor configuration," and the purge is in wt %.

In one embodiment, for the first aspect, the weight percent of ethylene-based feed flow, from the output of the Primary compressor system, and in the feed to the last two reaction zones, receiving an ethylene based feed stream," is varied using the smaller range i) or ii) as follows:

i) the ethylene-based feed flow from the output of the Primary compressor system is from 0 wt % to 100 wt %;

ii) the ethylene-based feed flow from the output of the Primary compressor system is from 0 wt % to a value defined by the following equation:

$$\frac{[(\text{Conversion} \times A) + \text{purge}]}{Y \%} \times 100\% \text{ wt},$$

where A=1.25, and further 1.22, or 1.20, or 1.18, or 1.15, and wherein Y is the percentage of the ethylene-based feed stream to the last two reaction zones, receiving an ethylene based feed, based on the total amount of ethylene-based streams to the reactor configuration, and the "conversion (in wt %)" is the "polymer output divided by the total feed flow to the reactor configuration," and the purge is in wt %.

In one embodiment, for the first aspect, the weight percent of ethylene-based feed flow, from the output of the Primary compressor system, and in the feed to the last reaction zones, receiving an ethylene based feed stream," is varied using the smaller range i) or ii) as follows:

i) from 0 wt % to 100 wt %, or
ii) from 0 wt % to a value determined by the following equation:

$$\frac{\text{Conversion} \times A + \text{wt \% purge}}{W \%} \times 100\% \text{ wt,}$$

where A=1.25, and further 1.22, or 1.20, or 1.18, or 1.15, and wherein W is the percentage of the ethylene-based feed stream to the last reaction zone, receiving an ethylene based feed, based on the total amount of ethylene-based streams to the reactor configuration, and the "conversion (in wt %)" is the "polymer output divided by the total feed flow to the reactor configuration," and the purge is in wt %.

In one embodiment, for the first aspect, the reactor system comprises a Hyper compressor system, which comprises a suction side, and a first stage compression and a second stage compression connected by an interstage system; and wherein a CTA make-up stream is fed, prior to the first reaction zone, as follows: a) to a line leading to the suction side of the Hyper compressor system, and/or b) to a line in the interstage system, and/or c) to a feed cooler, and/or d) to a pre-heater; and wherein a) through d) are each upstream from the first reaction zone.

In one embodiment, for the first aspect, each ethylene based feed stream to the reactor, receives an even number of discharge streams from the last compressor stage of the Hyper compressor system, and wherein each discharge stream is generated from one cylinder of the Hyper compressor system.

In one embodiment, for the first aspect, the ethylene based throughput from the Hyper compressor system is from 40 to 500 KTA, or from 60 to 400 KTA, or from 80 to 300 KTA (Kilotons per Annual).

In one embodiment, for the first aspect, the reaction mixture further comprises at least one CTA selected from an aldehyde, an alkane, a ketone, an alcohol, an ester, an alpha-olefin, or a combination thereof.

In one embodiment, for the second aspect, the Hyper compressor system configuration comprises at least three separate interstage cooling systems, and wherein each interstage cooling system comprises an inlet stream and an outlet stream, and wherein the outlet streams of the separate interstage cooling systems are not combined.

The invention also provides a reactor system comprising a reactor configuration and the inventive Hyper compressor system as described herein.

In one embodiment, for the second aspect, the Hyper compressor system, wherein the Hyper compressor system comprises a suction side, and a first stage compression and a second stage compression connected by an interstage system, and wherein a CTA make-up stream can be fed, prior to the first reaction zone to a) a line leading to the suction side of the Hyper compressor system, and/or b) to a line in the interstage system, and/or c) to an output line from the Hyper compressor system to a pre-heater, and/or d) to a preheater; and/or e) to a first reaction zone and/or f) to one or more sequential reaction zones; and wherein a) through d) are each upstream from the first reaction zone.

In one embodiment, for the second aspect, the Hyper compressor system comprising at least the following components a) at least two compressing stages, and b) at least two output lines, and c) at least two inlet lines; and d) at least one interstage that comprises at least two separate interstage cooling systems and e) optionally, at least one pressure balancing line between the separate interstage cooling systems, and f) optionally, at least one pressure balancing line between the separate output lines.

In one embodiment, for the second aspect, at least one output line from a Hyper compressor system is fed to two different reactor zones by means of a splitter valve.

The following embodiment apply to both the first and second aspects of the invention.

In one embodiment, the compositions of the ethylene based feed streams going to the first and last reaction zones of the reactor configuration, and each receiving an ethylene based feed, are each controlled with a control system comprising a valve system, through which an ethylene based feed stream is flowed, to be later compressed and/or delivered to the respective reaction zone. In a further embodiment, the valve system comprises a three-way valve system.

In one embodiment, the control system comprises at least one valve. In one embodiment, the control system comprises at least two valves.

In one embodiment, the valve is a two-way valve, or a three-way valve. In one embodiment, the valve is a multiple-way valve with at least one inlet and at least two outlets, or at least two inlets and at least two outlets.

In one embodiment, the control system includes at least one analyzer. In one embodiment, each valve of the control system is connected to at least one analyzer, through a feedback loop.

In one embodiment, each line that feeds an ethylene-based feed stream to a reaction zone includes a valve to control the amount of the feed stream that enters the reaction zone. In one embodiment, one or more lines feeding an ethylene-based feed stream to a reaction zone includes a valve to control the distribution of the ethylene-based feed streams over the reaction zones.

In one embodiment, the reactor system further comprises at least one analyzer for detecting a component of a stream of the reactor configuration or determining a property of the ethylene-based polymer produced by the high pressure polymerization process. In a further embodiment, the analyzer and a valve system of the control system are connected through a feedback loop. In one embodiment, the analyzer is at least one of a gas chromatograph or an infrared spectrometer.

In one embodiment, the total ethylene based feed flow to the reactor configuration is from 30 to 400 tons per hr.

In one embodiment, the ethylene conversion is ≥28%, or ≥29%, or ≥30%, or ≥31%, or ≥32%.

In one embodiment, the reactor configuration comprises at least one tubular reactor. In one embodiment, the reactor configuration comprises at least an autoclave reactor.

In one embodiment, the reactor configuration comprises an autoclave reactor and a tubular reactor.

In one embodiment, the ethylene-based flows to the suctions of the Hyper compressor system are separately compressed and fed to the reactor configuration.

In one embodiment, the "concentrations of the output of the Primary compressor system" in the respective ethylene-based feed flows to the Hyper compressor system are different.

In one embodiment, the "concentrations of the output of the Primary compressor system" in the two ethylene-based feed flows to the Hyper compressor system are maintained in the interstage and discharge of the Hyper compressor system.

In one embodiment, the "concentrations of the output of the Primary compressor system" in the respective ethylene-based feed flows to the Hyper compressor system are maintained in the interstage flows and discharge flows of the Hyper compressor system and in the feed flows to the reactor.

In one embodiment, the CTA concentrations in the Hyper compressor system ethylene based suction flows are maintained in the interstage and discharge of the Hyper compressor.

In one embodiment the CTA concentrations in at least two ethylene based suction flows of the Hyper compressor system are maintained in the interstage and discharge of the Hyper compressor system.

In one embodiment, the CTA concentrations in the ethylene based suction flows of the Hyper compressor system are maintained in the interstage flows and discharge flows of the Hyper compressor system and in the ethylene-based feed flows to the reactor.

In one embodiment, the CTA concentrations in the ethylene based suction flows of the Hyper compressor system are maintained in the interstage flows and the discharge flows of the Hyper compressor system, but are changed in one or two ethylene-based feed flows to the reactor by injection of a CTA make-up feed.

In one embodiment, an ethylene-based feed flow coming from the discharge of a Hyper compressor system is distributed over two or more reaction zones through a flow distribution device. A flow distribution device can include a splitter valve system.

In one embodiment, Hyper compressor system comprises one or more pressure balancing lines, and the pressure balancing lines are located in the interstage and/or discharge of the Hyper compressor system. Further these lines affect the composition of the main interstage and/or compressor discharge flows by less than 5 wt % or, less than 3 wt % or less 2 wt % or less than 1 wt %, in each compression step using the pressure balancing lines. A "pressure balancing line" refers to a connecting line with a limited flow capacity between two main compression discharge lines, and is used to reduce the pressure pulsation in the two main compression discharge lines.

In one embodiment the balancing line is equipped by restricted orifice device.

In one embodiment the inlet pressure of the first reaction zone is less than, or equal to,
4000 bar, or ≤3600 bar, or ≤3200 bar, or ≤3000 bar, or ≤2800 bar, or ≤2600 bar, or ≤2400 bar, or ≤2200 bar, or ≤2000 bar, or ≤1800 bar, or ≤1600 bar.

In one embodiment, the suction, interstage and discharge ethylene based feed flows are each handled by single flow lines. In one embodiment, the suction, interstage and discharge ethylene based flows are each handled by a flow line system comprising single and/or parallel flow lines.

In one embodiment the Hyper compressor system has a single compression stage.

In one embodiment, the reactor system comprises one or more pre-heater(s) and/or one or more feed coolers. In one embodiment, the reactor system comprises parallel pre-heaters or feed coolers in at least one ethylene-based feed flow to the reactor.

In one embodiment, the invention provides a process for controlling polymer properties, particularly rheological properties, such as melt elasticity, G' and melt strength, through make-up and recycle ethylene distribution and/or CTA distribution, while maintaining all other reactor conditions (peak temperatures, start temperature of zone 1 and the inlet temperature). Melt elasticity, melt strength and/or rheological properties are each an indicator of MWD.

In one embodiment the reactor configuration comprises at least one tubular reactor. In one embodiment the reactor configuration comprises at least one autoclave reactor. In one embodiment the reactor configuration comprises at least one tubular reactor and at least one autoclave reactor.

In one embodiment, the first reaction zone is a tubular reaction zone. In one embodiment, each reaction zone is a tubular reaction zone. In one embodiment, the first reaction zone is an autoclave reaction zone.

In one embodiment, the reactor configuration comprises at least one Primary compressor and at least one Booster compressor. In one embodiment, the reactor system comprises 2, or 3, or 4, or 5, or 6, or more ethylene based feed streams.

In one embodiment, the first and second ethylene feed streams each comprise from 1 to 99 weight percent (wt %), or from 5 to 95 weight percent wt %, or from 10 to 90 wt %, or from 20 to 80 wt %, or from 30 to 70 wt %, or from 35 to 65 wt %, or from 40 to 60 wt %, or from 45 to 55 wt %, of the total ethylene fed to the process polymerization.

In one embodiment, the make-up ethylene does not contain a chain transfer agent other than one or more residual compounds originating from the ethylene production/fractionation process.

In one embodiment, total amount of make-up (fresh) CTA is only distributed to the first reaction zone. In one embodiment, total amount of make-up CTA is only distributed to the reaction zones other than, i.e., following, reaction zone 1. In one embodiment, total amount of make-up CTA is distributed to all reaction zones.

In one embodiment, the polymerization process operates without "injected" CTA, and with only "impurity" CTA compound(s) such impurities from the ethylene make-up, dissociation components from initiators, solvents, components deriving from lubrication oils.

In one embodiment, each feed to each reaction zone contains the same CTA system. In a further embodiment the CTA system of each feed contains a single CTA.

In one embodiment, at least one of the feeds to at least one of the reaction zones contains a CTA system that is different from at least one of the CTA system(s) to at least one other reaction zone. In one embodiment, at least one of the feeds to at least one of the reaction zones contains a CTA system that is different from at least one of the CTA systems to the other reaction zones. In one embodiment, each CTA is independently selected from an olefin, an aldehyde, a ketone, an alcohol, a saturated hydrocarbon, an ether, a thiol, a phosphine, an acetate, an amino, an amine, an amide, an ester, or an isocyanate.

In one embodiment, each of the polymerization conditions in the reaction zones, independently, comprises a set temperature less than 400° C., and an inlet pressure less than 1000 MPa, or less than 500 MPa. In one embodiment, the maximum polymerization temperature in each reaction zone is, independently, from 100 to 400° C.

In one embodiment, the Hyper compressor system comprises at least three separate interstage cooling systems, and wherein each interstage cooling system comprises an inlet stream and an outlet stream, and wherein the outlet streams of the separate interstage cooling systems are not combined.

An inventive process may comprise a combination of two or more embodiments as described herein. An inventive Hyper compressor system may comprise a combination of two or more embodiments as described herein.

The invention also provides an ethylene-based polymer made by an inventive process. In one embodiment, the ethylene-based polymer is a polyethylene homopolymer (e.g., an LDPE). In one embodiment, the ethylene-based polymer is an ethylene-based interpolymer comprising at least one comonomer. Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), ethylene vinyl silane (EVS), ethylene vinyl trimethyl silane (EVTMS), and other copolymers made with "silane-containing" comonomers, copolymers made with dienes (for example, ENB) or polyenes, and ethylene carbon monoxide (ECO). Other comonomers are described in Ehrlich, P.; Mortimer, G. A.; Adv. Polymer Science; Fundamentals of Free-radical Polymerization of Ethylene; Vol. 7, pp. 386-448 (1970).

In one embodiment, the ethylene-based polymers of this invention have a density from 0.910 to 0.940, more typically from 0.912 to 0.940 and even more typically from 0.915 to 0.935, grams per cubic centimeter (g/cc or g/cm$^3$). In one embodiment, the ethylene-based polymers of this invention have a typical melt index ($I_2$) from 0.1 to 100, more typically from 0.15 to 50, and even more typically from 0.2 to 20, grams per 10 minutes (g/10 min) at 190° C./2.16 kg. In one embodiment, the ethylene-based polymers of this invention have a typical Mw/Mn from 3 to 20, or from 3.5 to 16, or from 4 to 14. In one embodiment, the ethylene-based polymers of this invention have a melt strength from 0.1 to 40, or from 0.5 to 30 centiNewtons (cN). In one embodiment, the ethylene-based polymers of this invention have two or more of these density, melt index, Mw/Mn and melt strength properties.

The invention also provides a composition comprising an inventive ethylene-based polymer. In one embodiment, the composition further comprises another ethylene-based polymer. An inventive composition may comprise a combination of two or more embodiments as described herein. The invention also provides an article comprising at least one component formed an inventive composition. In one embodiment, the article is an extrusion coating resin. In another embodiment, the article is a film. In another embodiment, the article is an insulation material and/or a protection layer around a metal wire. In another embodiment, the article is foam. An inventive article may comprise the combination of two or more embodiments as described herein.

Definitions

Unless stated to the contrary, implicit from the context, or customary in the art, all parts and percents are based on weight, and all test methods are current as of the filing date of this application.

The terms "ethylene feed stream" or "ethylene based feed" or "ethylene based feed stream," or "ethylene feed flow," as used herein, refer to a feed stream to a reaction zone, and which contains a majority amount of ethylene, based on the molar amount of all of the components in the feed stream. Optionally one of more chain transfer agents, comonomers, other process components (like lubrication oil, solvent, etc.) and/or impurities (as for instance initiator degradation products) might be present in the feed stream.

The term "total ethylene based feed flow", as used herein, refers the sum of all ethylene-based feed flows fed to the reactor configuration.

The term "ethylene-based feed components," as used herein, refer to ethylene (make-up and/or recycled), and optionally CTA (make-up and/or recycled), solvent (make-up and/or recycled), comonomer(s) (make-up and/or recycled) and/or other components (for example, including, but not limited to, make-up and/or recycled lubrication oil(s), antioxidant(s), ethane, methane and/or initiator dissociation products), added to a reaction zone at an inlet to the reaction zone. In one embodiment, the ethylene-based feed components comprise the following: ethylene (make-up and/or recycled), and optionally CTA (make-up and/or recycled), solvent (make-up and/or recycled), comonomer(s) (make-up and/or recycled) and/or other components selected from the following: make-up and/or recycled lubrication oil(s), antioxidant(s), ethane, methane and/or initiator dissociation products. In another embodiment, the ethylene-based feed components comprise the following: ethylene (make-up and/or recycled), and optionally CTA (make-up and/or recycled), solvent (make-up and/or recycled), comonomer(s) (make-up and/or recycled) and/or other components selected from the following: make-up and/or recycled lubrication oil(s), antioxidant(s), ethane, methane, initiators (for example, oxygen) and/or initiator dissociation products.

The term "ethylene conversion" or "ethylene conversion level", as used herein, is defined by below equation:

$$\text{Conversion (wt \%)} = \frac{M_{Polymer\ output}\left(\frac{\text{kg}}{\text{hr}}\right)}{\text{Total Ethylene based feed flow}\left(\frac{\text{kg}}{\text{hr}}\right)} \times 100\%.$$

The term "ethylene-based polymer" refers to a polymer that comprises a majority amount of polymerized ethylene, based on the weight of the polymer, and, optionally, at least one comonomer. The term "ethylene-based copolymer" refers to a copolymer that comprises a majority amount of polymerized ethylene, based on the weight of the copolymer, and a comonomer as the only monomer types.

The term "high pressure polymerization process," as used herein, refers to a free radical polymerization process carried out at an elevated pressure of at least 1000 bar (100 MPa).

The terms "inlet stream", or "inlet flow", or "reaction zone inlet stream," as used herein, refer to the total mass flow or total molar flow at the inlet of a reaction zone, and consists of the mass flow or molar flow transferred from the previous reaction zone plus optional ethylene based feed streams, plus optionally CTA feed stream, plus optionally initiator feed stream fed optionally alone or together with another feed stream.

The terms "side stream" or "side feed stream," as used herein, refer to the ethylene-based feed stream, CTA system feed stream, and/or initiator system, to sequential reaction zones.

The term "reactor system," as used herein, refers to the devices used to polymerize and isolate a polymer. Such devices include, but are not limited to, one or more reactors, reactor pre-heater(s), monomer-reactor cooling device(s), Secondary compressor(s) (or Hyper compressor system(s)), Primary compressor(s), and/or Booster compressor(s).

The term "reactor configuration," as used herein, refers to one or more reactors, and optionally one or more reactor pre-heaters, used to polymerize a polymer. Such reactors include, but are not limited to, autoclave reactor(s), tubular reactor(s), and combinations of autoclave and tubular reactors.

The term "inlet pressure" or "reactor inlet pressure", as used herein, refers to the pressure level at the first inlet of the first reaction zone.

The term "preheater (or pre-heater)," as used herein, refers to the initial portion of a tubular reactor, where the discharged ethylene based feed flow from the Hyper-compressor system is heated to the desired start temperature.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by one or more heat transfer medium's flowing through jackets around the reactor. A reaction zone may also start with the addition of make-up and/or recycled ethylene, and/or free radicals or components which dissociate into and/or generate free radicals.

The term "first reaction zone," as used herein, refers to the first reactor zone where the polymerization is initiated by the addition of radicals and/or components which dissociate into and/or generate radicals. The first reaction zone ends at the point where there is a new feed of radicals, and/or components which dissociate into and/or generate radicals, and, optionally, make-up and/or recycled ethylene and/or comonomer(s).

The term "Hyper compressor system inlet pressure" as used herein refers to the pressure at the suction side of the Hyper compressor system.

The term "plunger(s)," or "cylinder(s)" as used herein, refers to a reciprocating pressurization device, within a cylinder assembly, compressing a gaseous feed (for example, an ethylene based feed) from the suction pressure to the interstage pressure of the secondary compressor system, or from the interstage pressure to the final discharge pressure of the secondary compression system. Typically the sizing of a plunger and a cylinder assembly are uniform within a compression stage (first or second) of a secondary compressor system, but differ between the first and second compression stages of a secondary compressor system.

Each plunger is housed inside a cylinder assembly.

The term "pulsation" as used herein, refers to the non-uniform flow conditions in the discharge of the plunger, caused by a reciprocating operation, including a filling and a delivery stage of the plunger assembly during each rotation turn of the driving shaft of the compressor. The non-uniform flow pattern causes varying pressure level in the discharge system, and therefore fluctuating pressure conditions in the compressor discharge and ethylene based feed streams. When two or more plunger discharges are combined, care should be taken to ensure that the flow patterns caused by the discharges of different plungers, used to form one ethylene-based interstage or reactor feed stream, are not overlapping in the combined discharge, thus minimizing the differences in minimum and maximum flow and in pressure fluctuations in the feed line to the reactor. Preferably the flow patterns are complementary (or out of phase) to each other. Preferably the plungers, which are aligned to one ethylene-based reactor feed stream should be out of phase and/or multiples of 2, 3 or 4 plunger combinations aligned to the ethylene based reactor feed stream.

The term "vibration," as used herein, refers to fast repeating movement in compressor equipment(s) and/or flow line(s) due to the flow pulsation caused by the reciprocating nature of the compressor plunger(s).

The term "maximum load allowed" of a secondary compressor system refers to the maximum mechanical force (load) that can be applied at the compressor frame and/or components associated with the cylinders, the plungers, and the connecting and driving shaft assemblies. The "maximum load allowed" is determined by the weakest component. The maximum load is determined by the manufacturer design pressure of the components, as well as by the inertial forces during operation.

The term "maximum electrical load" of a secondary compressor system, refers to the maximum power that an electrical motor, driving the compressor, is allowed to deliver in continuous operation, based on the manufacturer design of the motor.

The term "maximum design pressure" of a secondary compressor system refers to the maximum pressure that can be applied at the compressor frame and/or components associated with the cylinders, the plungers, and the connecting and driving shaft assemblies. The "maximum pressure" is determined by the weakest component. The maximum design pressure is specified by the manufacturer of secondary compressor system.

For example, in one embodiment, a valve-control system controls the flow ratio of one or two or more feed streams, for example, the system controls the distribution of the Primary compressor system output containing make-up ethylene, or recycle ethylene, or make-up CTA, over two or more feed streams to the reactor. Examples of a valve-control system is a system with two or more lines, each with an independent control valve or a multiple way control valve, distributing an inlet stream over two or more outlet streams.

The term "two port valve" or "two-way valve" refers to a valve with one inlet and one outlet, through which a fluid can flow through in either direction. The term "multiple-port valve" or "multiple way valve" refers to a valve with at least one inlet and at least one outlet and where the sum of inlets and outlets equals the number of ports on the valve.

In one embodiment, a control system can be used for a close loop control, in which the flow ratio of Primary compressor system output containing make-up ethylene and/or the high pressure recycle ethylene is adjusted, to obtain the target MWD or other target product properties or process variables such CTA concentrations. Alternatively, the polymer quality measurement for example, melt strength, melt elasticity or G' from an analyzer can be used by the control system to adjust the composition of the ethylene feeds to the reaction zones.

Alternatively the flow ratio can be controlled manually, for instance depending on product analysis by a product analyzer, for example, typical laboratory apparatus to measure melt elasticity, melt strength, G', optical property, etc. The set point of the flow ratio controller can be adjusted accordingly.

The terms "analyzer", or "on-line analyzer, or "at-line analyzer," as used, in reference to a polymerization process and/or a polymer isolation, refers to a device, incorporated with a reactor configuration, that measures the concentration of a reagent (for example a CTA) and/or a polymer property (for example, melt strength or melt elasticity, or other rheological property). Examples include, but are not limited to, Gas Chromatogram apparatus, Infrared Detector apparatus, and typical laboratory apparatus to measure melt elasticity, melt strength, G', optical property, etc.

The term "controlled composition," as used herein, in reference to an ethylene-based feed stream, refers to the percentage of high pressure recycle (HPR) and output from the primary compressor, in the ethylene-based feed stream to the reactor, and is determined by the distribution of the flows from HPR (High Pressure Recycle) and/or the output of the Primary compressor system, and which flows are regulated through a control system, prior to feeding to the Hyper compressor system, and/or to the reaction zone(s). The control system is a flow restricting device and/or flow controlling device, and a control system typically comprises one or more of control valves, splitter valves, and/or throttle valves. The controlled composition can be varied between the minimum and maximum levels of the output of the Primary compressor system, and/or HPR flow, in the ethylene-based feed flow to the first reaction zone, and in the last ethylene-based feed flow to a sequential reaction zone. The minimum and maximum levels are achievable without the use of the control system.

The term "control system," as used herein, in reference to a polymerization process, refers to a flow restricting device and/or flow controlling device, each used to control and/or to adjust the composition of a feed and/or flow of a feed to a reaction zone. Examples of a control system include, but are not limited to, one or more control valves, a splitter valves, and/or throttle valves. Each valve has at least an inlet and one outlet, and include one-way and more multi-way valves (for example, a three-way or four-way valve)

The "Primary compressor system," or similar terms, as used herein, refers to a device that compresses the following: a) the make-up incoming ethylene, and/or b) the low pressure recycle coming from the Booster compression system, and/or c) the recycled compressor packing leaks, each to the pressure level required at the inlet side of the Hyper compressor system. This compression can take place in one or multiple compression stages, and can be combined with intermediate cooling. The Primary compressor system can consist of single or multiple compressor frames, and can be potentially combined with Booster compressor frame(s). A Primary compressor system generates one output flow. The output is the ethylene based flow from the low pressure separator(s) plus the make-up ethylene flow, and optionally recompressed packing leaks from the compressor system(s) used in polymerization. The Primary compressor system can consist of one or more Primary compressors. Typically a Primary compressor system compresses a flow from 40 bar to the discharge pressure of 300 bar. A Primary compressor system containing a single frame can also be called a "Primary compressor."

The phrase "output from a Primary compressor system," or "Primary compressor system output," or "the output of the Primary compressor system," or "ethylene based flow from the output of the Primary compressor system," or similar terms, as used herein, refer to the ethylene based flow from the low pressure separator(s) plus the make-up ethylene flow and optionally recompressed packing leaks from the compressor system(s) used in polymerization.

The term "Secondary compressor system" or "Hyper compressor system," "Hyper comp. system," or similar terms, as used herein, refers to a device that compresses a feed stream; for example, at least one of the following: a) the ethylene-based components coming from the HPR (High Pressure Recycle), and/or b) the ethylene-based components, each coming from the Primary compressor system, each to a pressure level required to feed the reactor at its inlet pressure. This compression can take place in one or multiple compression stages, and can be combined with intermediate cooling. The Hyper compressor system comprises a reciprocating plunger compressor, and can consist of single or multiple compressor frame(s). A Hyper compressor system containing a single frame can also be called a "Hyper compressor system."

The term "secondary compressor throughput," as used herein, refers to the net amount of feed components, for example, ethylene-based feed components, compressed and fed to the reactor configuration. The secondary throughput is a function of the compression volume and the density of the feed components, for example, ethylene based components, at the suction side. The pressure and temperature conditions at the suction side of the secondary compressor will define the density of the feed components, for example, ethylene based components, to be compressed.

The "Booster compressor system," as used herein, is a device that compresses the following: a) the low pressure recycle coming from the LPS (Low pressure Separator), and b) optionally, the recycled compressor packing leaks, each to the pressure level required at the inlet side of the Primary compressor system. This compression can take place in one or multiple compression stages, and can be combined with intermediate cooling. A Booster compression system can consist of single or multiple compressor frames, and can be potentially combined with Primary compressor frame(s). A Booster compressor system containing a single frame can also be called a "Booster compressor." Typically a Booster compressor system compresses a flow, from 1 bar to the discharge pressure of 40 bar or to the feed pressure of the make-up ethylene.

The term "interstage system," as used herein, refers to the outlet (flow) of the plungers of the first compressor stage of the Hyper compressor system, and with includes the interstage-cooler(s) between the first and the second compressing stages of the Hyper compressor system-compressor system. The interstage system transfers the discharges(s) of the first compression stage to the suction(s) of a second compression stage or from discharges of a further compression stage to the suction(s) of a subsequent compression stage.

The term "interstage-cooler(s)," as used herein, refers to the coolers used to cool down the discharge flow from the plungers of a compressing stage of the Hyper compressor system before further compression.

The term "Hyper compressor ethylene based suction flow" refers to an ethylene-based flow with a given composition from the Primary compressor output, which comprises make-up ethylene and optionally make-up CTA. There are at least two Hyper compressor system suction flows feeding the inlet sides of Hyper compressor system, where each inlet side is feeding at least two cylinders in the first compression stage.

The phrase "two separate suction flows," refers to two Hyper compressor system ethylene-based suction flows, each with the same or different composition.

The term "discharge of Hyper compressor system" refers to the outlet side of the Hyper compressor system after the final compression step. The outlet side of Hyper compressor system consists of at least two ethylene-based reactor feed flows, each coming from at least 2 cylinders operating in the final compression stage.

The term "discharge stream," or "discharge flow," as used herein, refers to the stream coming from the discharge of a compressor (for example, a secondary compressor).

The term "make-up" or "fresh" as used herein, in reference to an ethylene-based feed component (i.e., "make-up ethylene," "make-up CTA"), refers to reactant provided from an external source(s), and not provided internally from a recycled source(s). For example, in an embodiment, make-up ethylene is used as "make-up ethylene" required to compensate for the ethylene consumed by the polymerization and/or lost through, for example, ethylene purge from the process and residual ethylene in the polymer.

The term "recycled," when used herein, in reference to a reactant (i.e., "recycled ethylene," "recycled CTA"), refers to unreacted reactant separated from the polymer in the high pressure separator(s) and/or the low pressure separator(s), and returned/compressed to the reactor.

The term "high pressure recycle," as used herein, refers to unreacted reactants such as ethylene, CTA, impurities from the inlet stream, dissociation components from initiators, solvents, separated in the gaseous discharge of the high pressure separator(s). Typically a purge flow is taken from HPR to prevent build-up of inert(s) and/or low reactive components in the polymerization process.

The term "low pressure recycle," as used herein, refers to unreacted reactants such as ethylene, CTA, impurities from the inlet stream, dissociate component initiators, solvents, separated in the gaseous discharge of the low pressure separator(s).

The terms "feed," or "feed flow," or "feed stream," as used herein, refer to make-up and/or recycled components (for example, ethylene, initiator, CTA, and/or solvent) added to a reaction zone at an inlet.

The term "mole fraction," as used herein, refers to the molar ratio of one component in a mixture to the total moles of the components of the mixture. Molar fraction can be determined by calculating the ratios of molar amounts or molar flows.

The term "weight fraction," as used herein, refers to the weight ratio of one component in a mixture to the total amount of the components of the mixture.

The phrase "weight fraction of make-up ethylene fed to the first reaction zone (FE1)," as used herein, refers to the amount of make-up ethylene fed (via a front stream) to the first reaction zone, divided by the amount of ethylene plus optional comonomer(s) plus optional CTA(s) fed (via a front stream) to the first reaction zone.

The phrase "weight fraction of make-up ethylene fed to the nth reaction zone (FEn)," as used herein, refers to the amount of make-up ethylene fed (via a side stream) to the nth reaction zone divided by the amount of ethylene plus optional comonomer(s) plus optional CTA(s) fed (via a side stream) to the nth reaction zone.

The phrase "Feed i," as used herein, refers to the amount of ethylene based feed flow from the output of the Primary compressor system fed to the reaction zone i, divided by the total amount of ethylene based feed sent to the reaction zone i.

The phrase "sum of the two last ethylene based feed flows," as used herein, refers to the total amount of the last two ethylene based feed flow to the reactor. For example, in the reactor configuration 25/25/50/0, indicating three ethylene based feed flows of 25 wt %, 25 wt % and 50 wt %, the sum of the two last ethylene based feed flow is 25 wt %+50 wt %=75 wt %.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate a new polymer chain. CTA is also known as telogen or telomer. The terms "CTA activity" or "chain transfer activity coefficient (Cs value)" as used herein, refer to the ratio between the "rate of chain transfer" to the "rate of ethylene propagation." See Mortimer references provided in the experimental section below. The terms "Z1/Zi" as used herein is determined as follows. The "reactor zone molar concentration of a CTA$_j$ in a reactor zone i ([CTA]$_{ji}$)" is defined as the "total molar amount of that CTA fed (excluding a transfer from a previous reaction zone) into reactor zones k=1 to k=i" divided by the "total molar amount of ethylene fed (excluding a transfers from a previous reaction zone) into reactor zones 1 to i." (i≥1). The example calculation of Z1/Zi is shown in Table 2. This relationship is shown below in Equation AC.

$$[CTA]_{j_i} = \frac{\sum_{k=1}^{i} n_{CTA,j_k}}{\sum_{k=1}^{i} n_{eth_k}}. \quad \text{(Eqn. AC)}$$

In Equation AC, j≥1, $n_{CTA,j_k}$ is the "amount of moles of the jth CTA make-up injected to the kth reactor zone (where k=1 to i)," and $n_{eth_k}$ is the "amount of moles of ethylene make-up injected to the kth reactor zone (where k=1 to i)."

The "transfer activity of a CTA (system) in a reactor zone I (Zi)" is defined as the "sum of the reactor zone molar concentration of each CTA in the reactor zone" multiplied with its chain transfer activity constant (Cs)—see Equation BC. The chain transfer activity constant (Cs) is the ratio of reaction rates Ks/Kp, at a reference pressure (1360 atm) and a reference temperature (130° C.). This relationship is shown below in Equation BC, where $n_{compi}$ is the total number of CTAs in reactor zone i. Note i≥1, and $n_{compi}$≥1.

$$Z_i = \sum_{j=1}^{n_{compi}} [CTA]_{j_i} \wedge C_{s,j}. \quad \text{(Eqn. BC)}$$

The term "FE1/FEi", as used herein, refers to, for reaction zone n, the ratio of the "weight fraction of make-up ethylene fed to the first reaction zone (RZ1)" to the "weight fraction of make-up ethylene fed to reaction zone n (Zi)" (i>1). The example calculation of FE1/FEi is shown in Table 2. The term "feed conditions", as used herein, refers to the flows in moles (or weight) of the components fed to the reactor, for instance ethylene, CTA, initiators and/or co-monomer(s).

EXPERIMENTAL

CTA Systems for polymerization. Potential CTA systems for inventive operation:

Table 1 contains examples of high (propionaldehyde), medium (propylene) and Low (isobutane) CTA's. More CTA candidates can be found in the Mortimer references. Typically the conversion level of CTA in the reactor is a function of CTA activity and ethylene conversion level. Typically the molar CTA consumption in the reactor is a function product melt index and the reactor conditions and is not influenced by the CTA activity; however the CTA level required in the reactor is a function of the CTA activity and will be higher for low active CTA's and lower for high active CTA's resulting into low conversion level for a low active CTA and a high conversion level for a high active CTA. As a consequence the CTA make-up flow has more impact on the distribution of CTA concentration in case of a high CTA versus a low impact in case of low active CTA.

TABLE 1

Kinetic Constants for Selected CTAs

| | Chain Transfer to Modifier | | | Reactivity Ratios | |
|---|---|---|---|---|---|
| | $k_o$ | $E_a$ | $\Delta V$ | | |
| Component | [m3/(hr* kgmol)] | cal/ mol | cc/ mol | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |

Propylene will beside of its CTA functionality also act as a comonomer, resulting in additional methyl branches. These additional methyl branches will typically lower the density of the polymer by 0.001 to 0.004 g/cc. Furthermore the comonomer activity will increase the overall consumption level per reactor pass, by which more propylene has to be added to compensate for the consumption as CTA as well as comonomer.

References: General: G. Luft, *Chem.-Ing.-Tech., Hochdruck-Polyaethylen*, Vol. 51 (1979) Nr. 10, pages 960-969. Peroxide efficiency: T. van der Molen et al., *Ing. Chim. Ital, "Light-off" temperature and consumption of 16 initiators in LDPE production*, Vol. 18, N. 1-2, February 1982, pages 7-15. Chain transfer activity and comonomer reactivity scheme data are described in the following: P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at 1360 atm and 130° C.*; Vol. 8, p 1513-1523 (1970); G. Mortimer, Journal of Polymer Science: Part A-1, *Chain transfer in ethylene polymerization. Part V. The effect of temperature*; Vol. 8, p 1535-1542 (1970); G. Mortimer, Journal of Polymer Science: Part A-1, *Chain transfer in ethylene polymerization Part V. The effect of pressure*, Vol. 8, p 1543-1548 (1970); and G. Mortimer, Journal of Polymer Science: Part A-1, *Chain transfer in ethylene polymerization VII. Very reactive and depleteable transfer agents*, Vol. 10, p 163-168 (1972). See LDPE simulation model in S. Goto et al., *Journal of Applied Polymer Science: Applied Polymer Symposium*, 36, 21-40, 1981 (*Title: Computer model for commercial high pressure polyethylene reactor based on elementary reaction rates obtained experimentally*).

Process flow diagram used in CP1 (simulated polymerization)—FIG. 1 (CP1) shows the flow scheme where total ethylene based feed flow is only distributed to the first reaction zone. The High Pressure Recycle (HPR) flow (line 1) is mixed up with the combined Low Pressure Recycle and make-up ethylene (line 2) to form (line 6), which is sent to the suction of the Hyper compressor system. The discharge flow from the Hyper compressor system (line 11) is sent to the first reaction zone of the reactor. Make-up CTA is added into the process at the suction of the Hyper compressor system, and can be optionally fed at the inter-section between the first and second stages or at the discharge of the Hyper compressor system.

Figure 2:
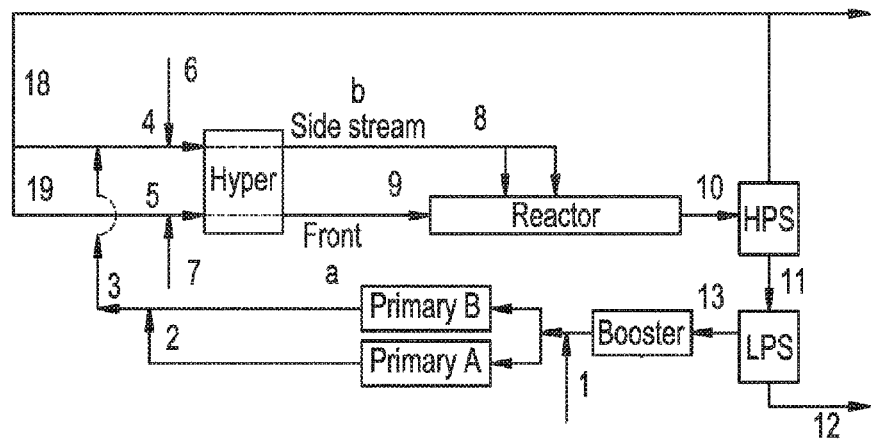
FIG. 2 is Hyper compressor system layout for 50/35/15 ethylene based feed distribution (CP2).

Process flow diagram used in CP2 (FIG. 2)—FIG. 2 shows CP2 shows the flow scheme of the high pressure polymerization process with a tubular reactor, used to produce Comparative Example CP2. Stream (1), ethylene make-up, is compressed together with the output of the Booster compression system by Primary compressor system resulting in flow (3). Stream (3) is fed together with additional ethylene from the high pressure recycle stream (19) through line 5 to the section of the Hyper compressor system feeding the side (8) of the Reactor. The section of the Hyper compressor system feeding the front stream (9) receives ethylene feed through line (19) and (5) from the high pressure recycle stream (19). Line (6) and Line (7) depict each separate line for feeding separately CTA to respectively line (4) and/or line (5). Information about the Reactor system can be found below. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated step.

Figure 3:
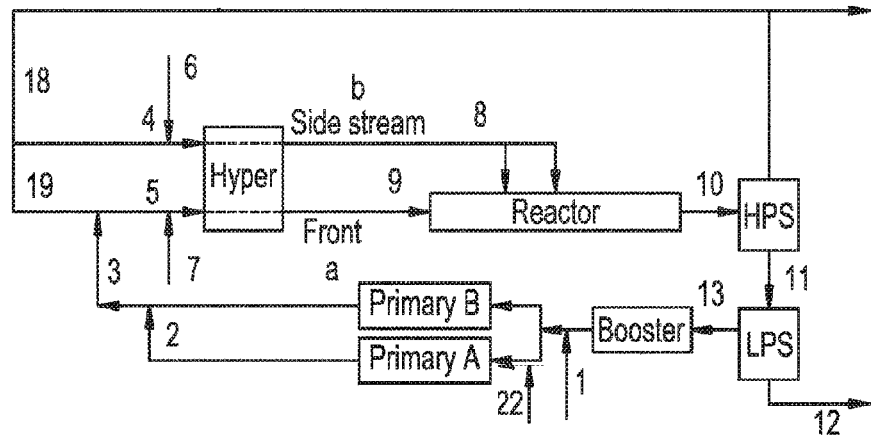
FIG. 3 is Hyper compressor system layout for 50/35/15 ethylene based feed distribution (CP3).

Process Flow scheme used for CP3—FIG. 3 shows the flow scheme of the high pressure polymerization process with a tubular reactor, used to produce CP3 Stream (1), ethylene make-up, is compressed together with the output of the Booster compression system, by Primary compressor system, resulting in flow (2) and (3). Stream (3) is combined with high pressure recycle stream (19) and fed through line 5 to the section of the Hyper compressor system feeding the front (9) of the Reactor. The section of the Hyper compressor system feeding the side stream (8) receives ethylene feed through line (4). Line (4) receives ethylene feed from line (18). The CTA is fed through line (23). Line 22 is an optional line to feed a CTA component, but was not used in this example. The Hyper compressor system pressurizes the ethylene feed streams to a level sufficient to feed the high pressure tubular reactor (Reactor). In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated procedures.

Figure 4A:
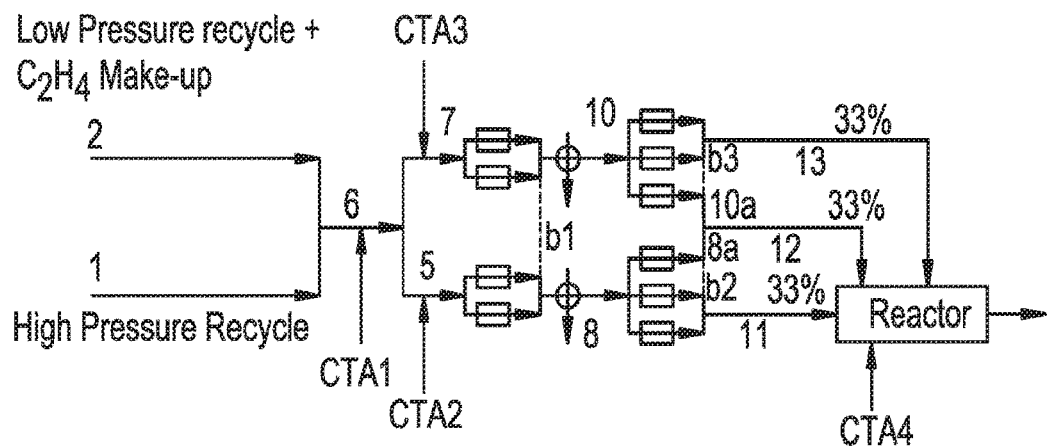
FIG. 4*a* is Hyper compressor system layout with 10 plungers for 33/33/33/0 ethylene based feed distribution (CP4 and CP5).

Process Flow Diagram used for CP4 and CP5 (FIG. 4a)—FIG. 4a (CP4, CP5) shows the flow scheme with three ethylene based reactor feed distribution (33/33/33/0). The Hyper compressor system has ten cylinders, of which four cylinders are installed in the first and six cylinders are in the second stage. The suction lines 5 and 7 and the interstage lines 8 and 10 are each handling 50% of the total ethylene based flow, while the discharge or reactor feed lines 11, 12 and 13 are each handling ⅓ or 33% of the total ethylene based flow. Optionally, pressure balancing lines (b1, b2 or b3) can be installed to reduce the pressure and/or flow pulsation in lines 8, 10, 11, 12 or 13. Line 8 and 10 show the Hyper compressor system interstage lines with interstage coolers. The HPR flow (line 1) with high CTA concentration is combined with the LPR and make-up ethylene (line 2) with low CTA concentration to make line 6. Make-up CTA can be added in different locations, for instance through CTA1, CTA2, CTA4 and/or CTA3. In this configuration the CTA level in the reactor feeds can only be influenced by the amount of make-up CTA feed per feed location.

Figure 4B:
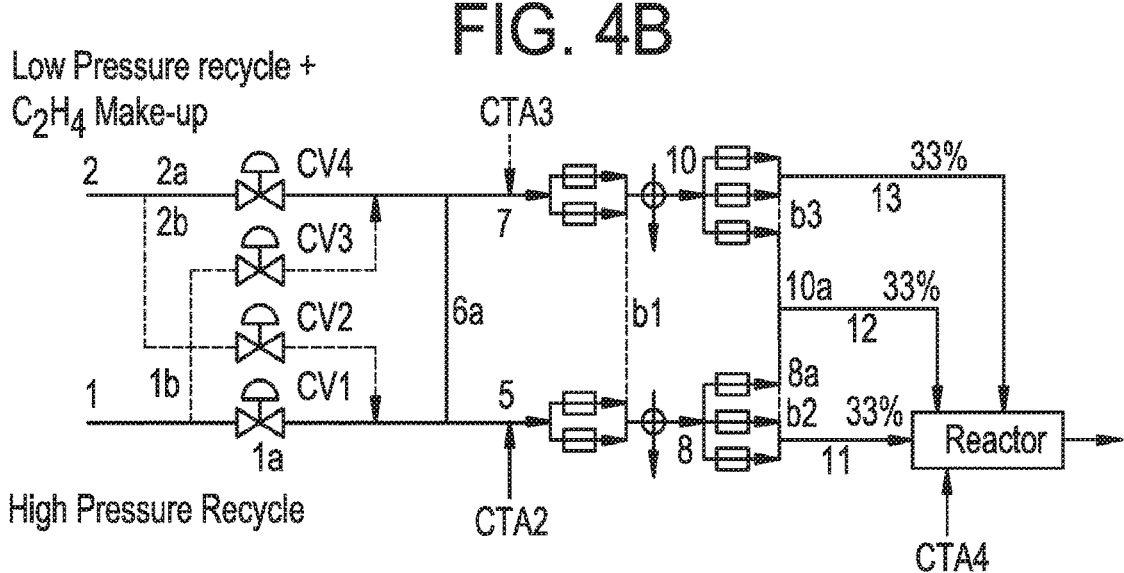
FIG. 4*b* is Hyper compressor system layout with 10 plungers for 33/33/33/0 ethylene based feed distribution (IP4.1, IP4.2, IP4.3, IP5.1, IP5.2 and IP5.3).

Process Flow Diagram used for IP4.1, IP4.2, IP4.3, IP5.1, IP5.2 and IP5.3 (FIG. 4b)—FIG. 4b (IP4.1, IP4.2, IP4.3, IP5.1, IP5.2 and IP5.3) shows the flow scheme with three-ethylene based reactor feed distribution (33/33/33/0). The Hyper compressor system has ten cylinders of which four cylinders are installed in the first and six cylinders are in the second stage. The suction lines 5 and 7 and the interstage lines 8 and 10 are each handling 50% of the total ethylene based flow, while the discharge or reactor feed lines 11, 12 and 13 are each handling ⅓ or 33% of the total ethylene based flow. Optionally balancing lines (b1, b2 or b3) can be installed to reduce the pressure and/or flow pulsation in lines 8, 10, 11, 12 or 13. Line 8 and 10 show the Hyper compressor system interstage lines with interstage coolers.

Description without distribution control system (FIG. 4b) 1a, 1b, 2a, 2b, CV1, CV2, CV3 and CV4. The HPR flow with high concentration of CTA (line 1 and 1a) is primarily sent to the suction of the Hyper compressor system through line 5. The remaining HPR flow (line 6) is combined with the LPR flow/make-up ethylene (low CTA concentration, line 2 and 2a) and sent to the suction of the Hyper compressor system through line 7. The discharge flow from line 8 is split up into two streams in which line 11 (consisting of 33.3% of the total ethylene based feed distribution) is sent to the first reaction zone. The discharge flow 11, 12 and 13 are each receiving compressed ethylene from two cylinders. Make-up CTA can be added into the suction of the Hyper compressor system (CTA2 and/or CTA3) or directly fed to the first reaction zone (CTA4) thus enhancing CTA level at the first reaction zone. This configuration in combination with CTA injection through CTA2 and/or CTA4 is preferred for making narrow MWD polymers.

An optional distribution control system (FIG. 4b), consisting for example of 1b, 2b, CV1, CV2, CV3 and CV4, can be installed and used. This system allows control on how the ethylene-based flows from line 1 and 2 are distributed over line 5 and 7. CV1, CV2, CV3 and CV4 are control valves in line 1a, 2b, 1b and 2a to distribute line 1 and 2 over line 5 and 7. This potential reversed distribution of 1 and 2 through line 1b and 2b over 5 and 6 expands the MWD capability from very narrow to very broad and in between MWD polymers. Make-up CTA can be added into the suction of the Hyper compressor system (CTA2 and/or CTA3) or directly fed to the first reaction zone (CTA4).

Figure 5A:
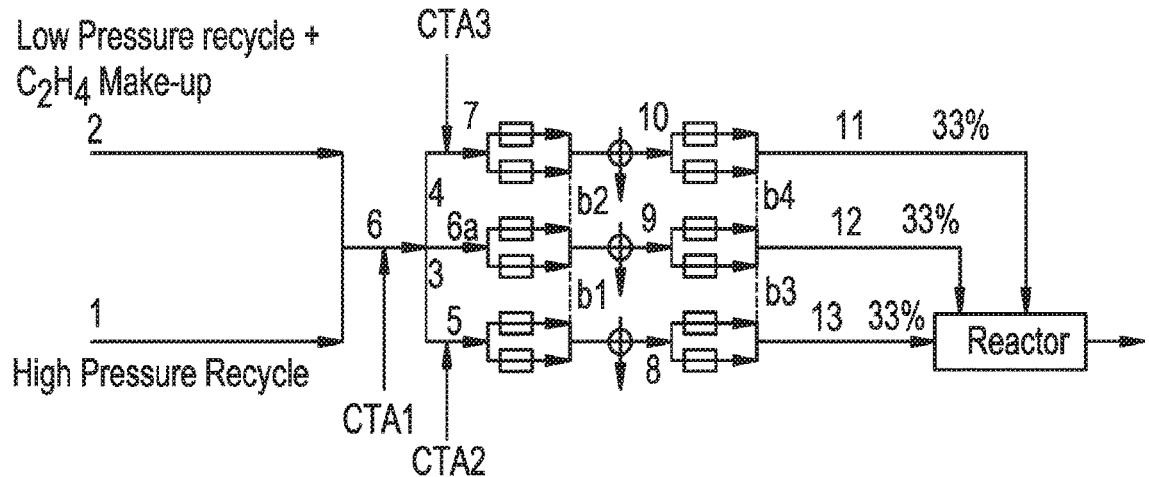
FIG. 5a is Hyper compressor system layout with 12 plungers for 33/33/33/0 ethylene based feed distribution (CP6 and CP7).

Process Flow Diagram used for CP6 and CP7 (FIG. 5a)—FIG. 5a (CP6 and CP7) shows the flow scheme with three ethylene based feed distribution (33/33/33/0). The Hyper compressor system has twelve cylinders of which six cylinders are installed in the first and the six cylinders are in the second stages. The suction lines 5, 6a and 7 and the interstage lines 8, 9 and 10 as well as the discharge or reactor feed lines 11, 12 and 13 are each handling ⅓ or 33% of the total ethylene based flow. Optionally balancing lines (b1, b2, b3 and or b4) can be installed to reduce the pressure and/or flow pulsation in lines 8, 9, 10, 11, 12 or 13. Line 8, 9 and 10 show the Hyper compressor system interstage lines with interstage coolers. The HPR flow (line 1) with high CTA concentration is combined with the LPR and make-up ethylene (line 2) which low CTA concentration to make line 6. Make-up CTA can be added in different locations, for instance through CTA1, CTA2, CTA4 and/or CTA3. In this configuration the CTA level in the reactor feeds can only be influenced by the amount of make-up CTA feed per location.

Figure 5B:
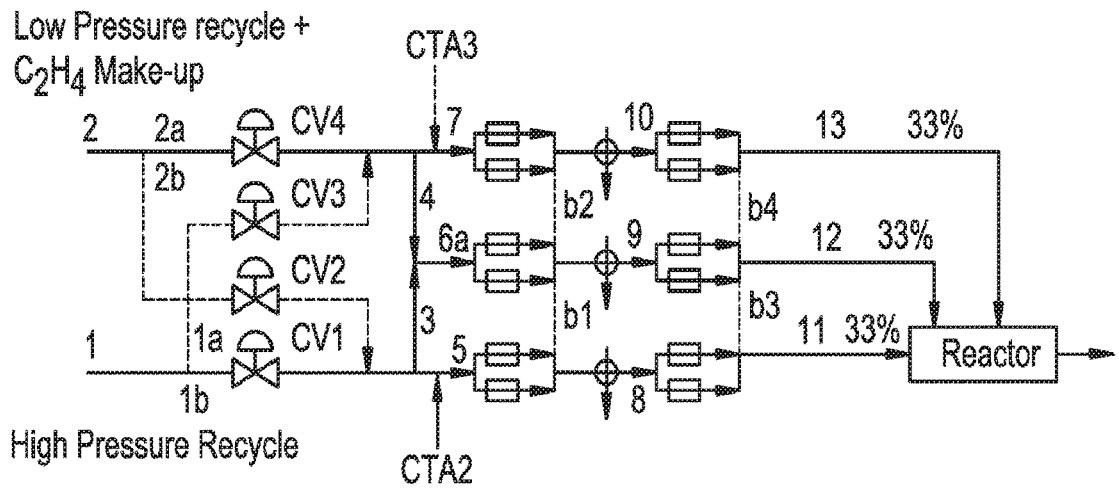
FIG. 5b is Hyper compressor system layout with 12 plungers for 33/33/33/0 ethylene based feed distribution (IP6.1, IP6.2, IP6.3, IP7.1, IP7.2 and IP7.3).

Process Flow Diagram used for IP6.1, IP6.2, IP6.3, IP7.1, IP7.2 and IP7.3 (FIG. 5b)—FIG. 5b (IP6.1, IP6.2, IP6.3, IP7.1, IP7.2 and IP7.3) shows the flow scheme with three-ethylene based reactor feed distribution (33/33/33/0). The Hyper compressor system has twelve cylinders of which six cylinders are each installed in the first and second stages. The suction lines 5, 6a and 7 and the interstage lines 8, 9 and 10 as well as the discharge or reactor feed lines 11, 12 and 13 are each handling ⅓ or 33% of the total ethylene based flow. Lines 3 and 4 are the flow balancing connection. Optionally, balancing lines (b1, b2, b3 and/or b4) can be installed to reduce the pressure and/or flow pulsation in lines 8, 9, 10, 11, 12 and/or 13. Line 8, 9 and 10 show the Hyper compressor system interstage lines with interstage coolers. Description without distribution control system 1a, 1b, 2a, 2b, CV1, CV2, CV3 and CV4.

The HPR flow with high concentration of CTA (line 1 and 1a) is primarily sent to the suction of the Hyper compressor system through line 5, while the LPR flow/make-up ethylene (low CTA concentration, line 2 and 2a) is primarily sent to the suction of the Hyper compressor system through line 7. The remaining HPR flow (line 3) is combined with the remaining LPR flow/make-up ethylene (line 4) and sent to the suction of the Hyper compressor system through line 6a. The discharge flow 11, 12 and 13 are each receiving compressed ethylene from two cylinders. Make-up CTA can be added into the suction of the Hyper compressor system (CTA2 and/or CTA3) or directly fed to the first reaction zone (CTA4) thus enhancing CTA level at the first reaction zone. This configuration in combination with CTA injection through CTA2 and/or CTA4 is preferred for making narrow MWD polymers.

An optional distribution control system (FIG. 5b), consisting for example of 1b, 2b, CV1, CV2, CV3 and CV4, can be installed and used. CV1, CV2, CV3 and CV4 are control valves in line 1a, 2b, 1b and 2a to distribute line 1 and 2 over line 5, 6a and 7. This potential reversed distribution of 1 and 2 through line 1b and 2b over 5, 6a and 7 expands the MWD capability from very narrow to very broad and in between MWD polymers. Make-up CTA can be added into the suction of the Hyper compressor system (CTA2 and/or CTA3).

Figure 6A:
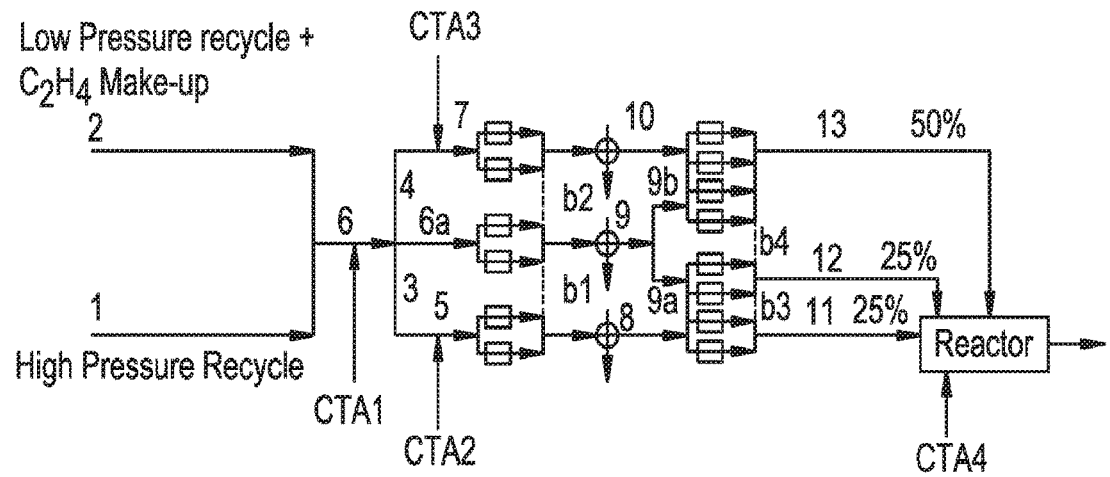
FIG. 6a is Hyper compressor system layout with 14 plungers for 25/25/50/0 ethylene based feed distribution (CP8 and CP9).

Process Flow Diagram used for CP8 and CP9 (FIG. 6a)—FIG. 6a (CP8 and CP9) shows the flow scheme with three ethylene based feed distribution (25/25/50). The Hyper compressor system has fourteen cylinders of which six cylinders are installed in the first and the eight cylinders are in the second stages. The suction lines 5, 6a and 7 and the interstage lines 8, 9 and 10 are each handling ⅓ or 33% of the total ethylene based flow, while the discharge lines 11, 12 and 13 are handling 25%, 25% and 50% of the total ethylene based feed flow. Optionally balancing lines (b1, b2, b3 and or b4) can be installed to reduce the pressure and/or flow pulsation in lines 8, 9, 10, 11, 12 or 13. Line 8, 9 and 10 show the Hyper compressor system interstage lines with interstage coolers. Line 9 is divided into 9a and 9b. The HPR flow (line 1 or line 1a) with high CTA concentration is combined with the LPR and make-up ethylene (line 2 or line 2a) which low CTA concentration to make line 6a. Make-up CTA can be added in different locations, for instance through CTA1, CTA2, CTA4 and/or CTA3. In this configuration the CTA level in the reactor feeds can only be influenced by the location of make-up CTA feed.

Figure 6B:
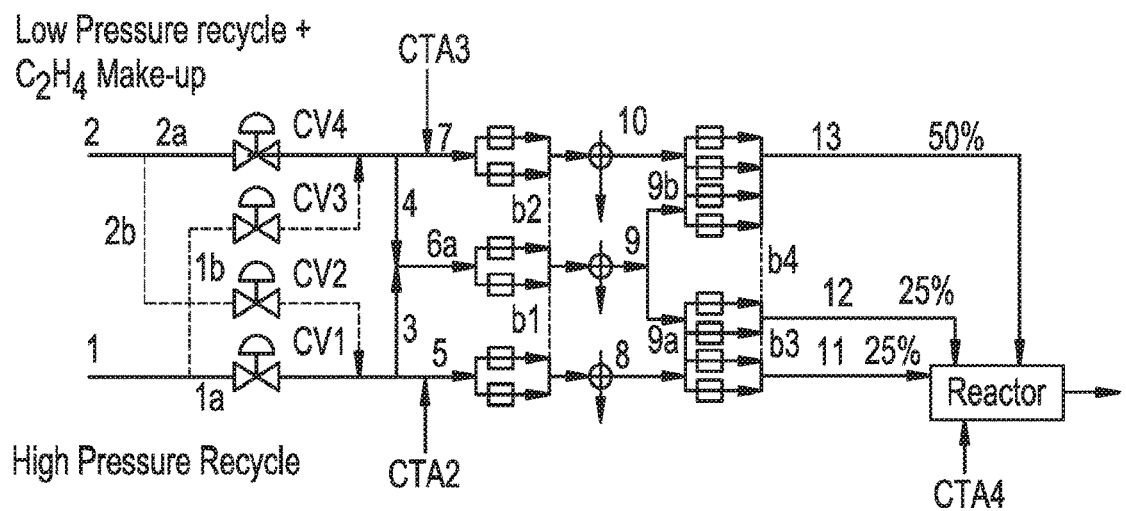
FIG. 6b is Hyper compressor system layout with 14 plungers for 25/25/50/0 ethylene based feed distribution (IP8.1, IP8.2, IP8.3, IP9.1, IP9.2 and IP9.3).

Process Flow Diagram used for IP8.1, IP8.2, IP8.3, IP9.1, IP9.2 and IP9.3 (FIG. 6b)—FIG. 6b (IP8.1, IP8.2, IP8.3, IP9.1, IP9.2 and IP9.3) shows the flow scheme with three-ethylene based reactor feed distribution (25/25/50/0). The Hyper compressor system has fourteen cylinders of which six cylinders are each installed in the first and eight cylinders are in the second stage. The suction lines 5, 6a and 7 and the interstage lines 8, 9 and 10 are each handling ⅓ or 33% of the total ethylene based flow, while the discharge or reactor feed lines 11, 12 and 13 are handling 25%, 25% and 50% of the total ethylene based flow. Lines 3 and 4 are the balancing flow line before sending to the suction of the Hyper compressor system. Optionally balancing lines (b1, b2, b3 and/or b4) can be installed to reduce the pressure and/or flow pulsation in lines 8, 9, 10, 11, 12 and/or 13. Line 8, 9 and 10 show the Hyper compressor system interstage lines with interstage coolers. Line 9 is divided into 9a and 9b.

Description without distribution control system (FIG. 6b) 1a, 1b, 2a, 2b, CV1, CV2, CV3 and CV4. The HPR flow with high concentration of CTA (line 1 and 1a) is primarily sent to the suction of the Hyper compressor system through line 5, while the LPR flow/make-up ethylene (low CTA concentration, line 2 and 2a) is primarily sent to the suction of the Hyper compressor system through line 7. The remaining HPR flow (line 3) is combined with the remaining LPR flow/make-up ethylene (line 4) and sent to the suction of the Hyper compressor system through line 6a. The discharge flow 11, 12 are each receiving 25% of the total compressed ethylene based from two cylinders, while the discharge flow 13 is receiving 50% of the total compressed ethylene based flow from four cylinders. Make-up CTA can be added into the suction of the Hyper compressor system (CTA2 and/or CTA3) or directly fed to the first reaction zone (CTA4) thus enhancing CTA level at the first reaction zone. This configuration in combination with CTA injection through CTA2 and/or CTA4 is preferred for making narrow MWD polymers.

An optional distribution control system (FIG. 6b), consisting for example of 1b, 2b, CV1, CV2, CV3 and CV4, can be installed and used. CV1, CV2, CV3 and CV4 are control valves in line 1a, 2b, 1b and 2a to distribute line 1 and 2 over line 5, 6a and 7. This potential reversed distribution of 1 and 2 through line 1b and 2b over 5, 6a and 7 expands the MWD capability from very narrow to very broad and in between MWD polymers. CV1, CV2, CV3 and CV4 are control valves in line 1a, 2b, 1b and 2a to distribute line 1 and 2 over line 5, 6a and 7. This potential reversed distribution of 1 and 2 through line 1b and 2b over 5, 6a and 7 expands the MWD capability from very narrow to very broad and in between MWD polymers. Make-up CTA can be added into the suction of the Hyper compressor system (CTA2 and/or CTA3).

Figure 7A:
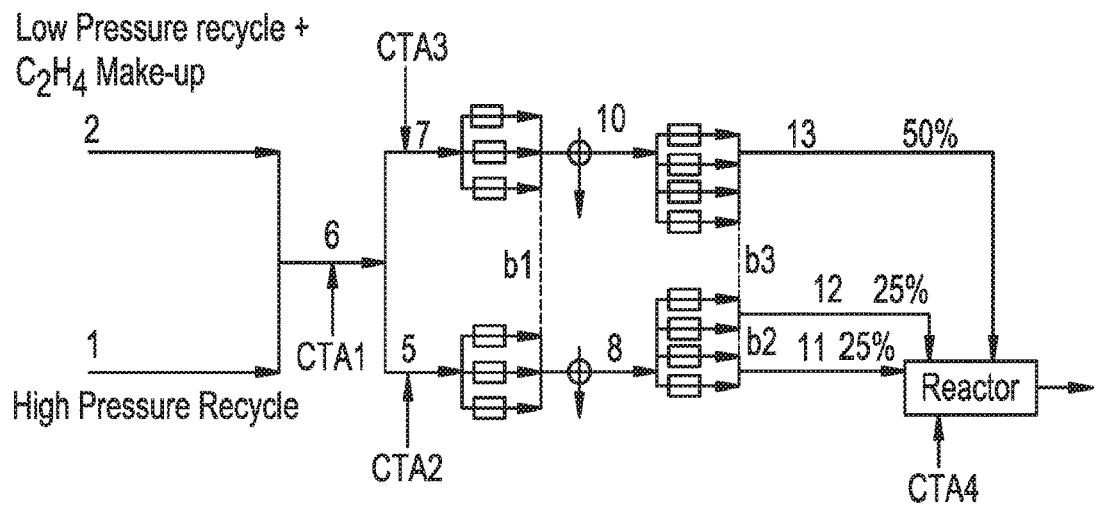
FIG. 7a is Hyper compressor system layout with 14 plungers for 25/25/50/0 ethylene based feed distribution (CP10 and CP11).

Process Flow Diagram used for CP10 and CP11 (FIG. 7a)—FIG. 7a shows the flow scheme with three ethylene based feed distribution (25/25/50). The Hyper compressor system has fourteen cylinders of which six cylinders are installed in the first and the eight cylinders are in the second stages. The suction lines 5 and 7 and the interstage lines 8 and 10 are each handling 50% of the total ethylene based flow, while the discharge lines 11, 12 and 13 are handling 25%, 25% and 50% of the total compressed ethylene based feed flow fed to the reactor system. Optionally balancing lines (b1, b2, b3 and/or b4) can be installed to reduce the pressure and/or flow pulsation in lines 8, 10, 11, 12 and/or 13. Line 8 and 10 show the Hyper compressor system interstage lines with interstage coolers.

The HPR flow (line 1 or line 1a) with high CTA concentration is combined with the LPR and make-up ethylene (line 2 or line 2a) which low CTA concentration to make line 6. Make-up CTA can be added in different locations, for instance through CTA1, CTA2, CTA4 and/or CTA3. In this configuration the CTA level in the reactor feeds can only be influenced by the location of make-up CTA feed.

Figure 7B:
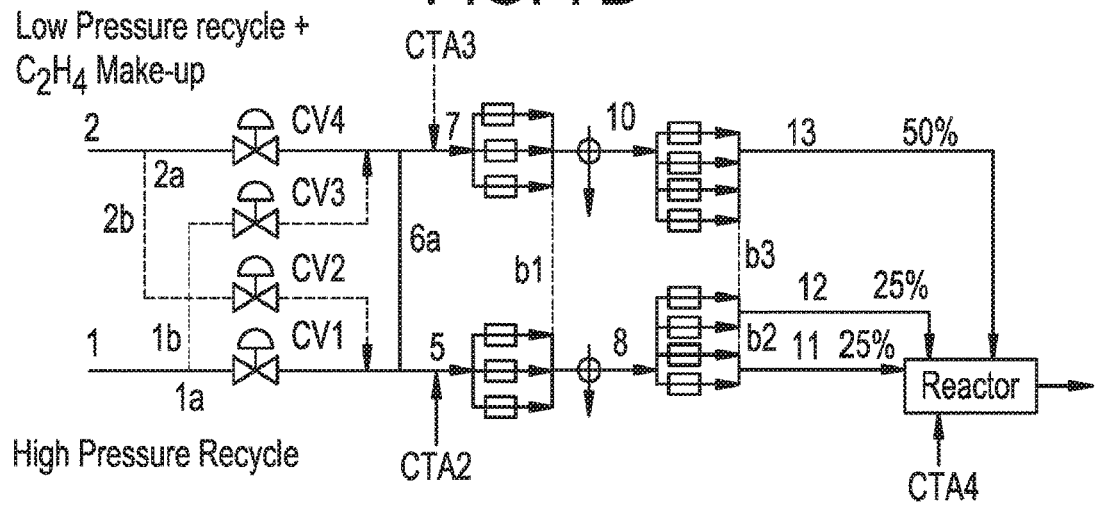
FIG. 7b is Hyper compressor system layout with 14 plungers for 25/25/50/0 ethylene based feed distribution CTA (IP10.1, IP10.2, IP10.3, IP11.1, IP11.2 and IP11.3).

Process Flow Diagram for IP10.1, IP10.2, IP10.3, IP11.1, IP11.2 and IP11.3 (FIG. 7b)—FIG. 7b shows the flow scheme with three-ethylene based reactor feed distribution (25/25/50/0). The Hyper compressor system has fourteen cylinders of which six cylinders are each installed in the first and eight cylinders are in the second stage. The suction lines 5 and 7 and the interstage lines 8 and 10 are each handling 50% of the total ethylene based flow, while the discharge or reactor feed lines 11, 12 and 13 are handling 25%, 25% and 50% of the total compressed ethylene based flow. Lines 6 is the balancing flow line before sending to the suction of the Hyper compressor system. Optionally balancing lines (b1, b2 and/or b3) can be installed to reduce the pressure and/or flow pulsation in lines 8, 9, 10, 11, 12 and/or 13. Line 8 and 10 show the Hyper compressor system interstage lines with interstage coolers.

Description without distribution control system (FIG. 7b) 1a, 1b, 2a, 2b, CV1, CV2, CV3 and CV4. The HPR flow with high concentration of CTA (line 1 and 1a) is primarily sent to the suction of the Hyper compressor system through line 5, while the LPR flow/make-up ethylene (low CTA concentration, line 2 and 2a) is combined with the remaining flow from HPR (line 6) and is sent to the suction of the Hyper compressor system through line 7. The discharge flows 11, 12 and 13 are receiving 25%, 25% and 50% of the total compressed ethylene based feed flow. Make-up CTA can be added into the suction of the Hyper compressor system (CTA2 and/or CTA3) or directly fed to the first reaction zone (CTA4) thus enhancing CTA level at the first reaction zone. This configuration in combination with CTA injection through CTA2 and/or CTA4 is preferred for making narrow MWD polymers. An optional distribution control system (FIG. 7b), consisting for example of 1b, 2b, CV1, CV2, CV3 and CV4, can be installed and used. CV1, CV2, CV3 and CV4 are control valves in line 1a, 2b, 1b and 2a to distribute line 1 and 2 over line 5 and 7. This potential reversed distribution of 1 and 2 through line 1b and 2b over 5 and 7 expands the MWD capability from very narrow to very broad and in between MWD polymers. Make-up CTA can be added into the suction of the Hyper compressor system (CTA2 and/or CTA3).

Figure 8A:
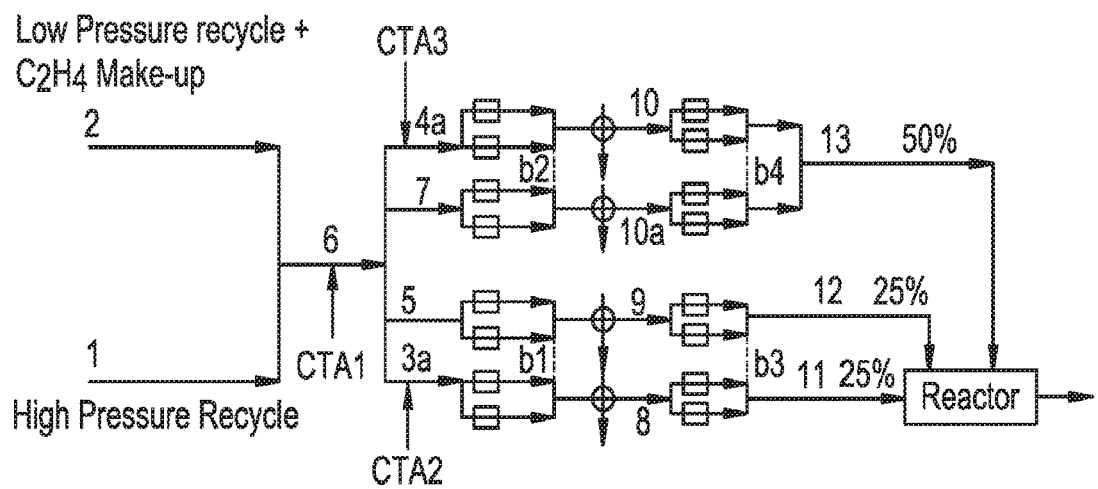
FIG. 8a is Hyper compressor system layout with 16 (2×8) plungers for 25/25/50/0 ethylene based feed distribution (CP12 and CP13).

Process Flow Diagram used for CP12 and CP13 (FIG. 8a)—FIG. 8a shows the flow scheme with three ethylene based feed distribution (25/25/50). The Hyper compressor system has sixteen cylinders of which each eight cylinders are installed in the first and the second stages. The suction lines 3a, 5, 7 and 4a and the interstage lines 8 and 10 are each handling 25% of the total ethylene based flow, while the discharge lines 11, 12 and 13 are handling 25%, 25% and 50% of the total ethylene based feed flow, respectively. Optionally, balancing lines (b1, b2, b3 and/or b4) can be installed to reduce the pressure and/or flow pulsation in lines 8, 9, 10a, 10, 11, 12 or 13. Line 8, 9, 10a and 10 show the Hyper compressor system interstage lines with interstage coolers. The HPR flow (line 1 or line 1a) with high CTA concentration is combined with the LPR and make-up ethylene (line 2 or line 2a) which low CTA concentration to make line 6. Make-up CTA can be added in different locations, for instance through CTA1, CTA2, CTA4 and/or CTA3. In this configuration the CTA level in the reactor feeds can only be influenced by the location of make-up CTA feed.

Figure 8B:
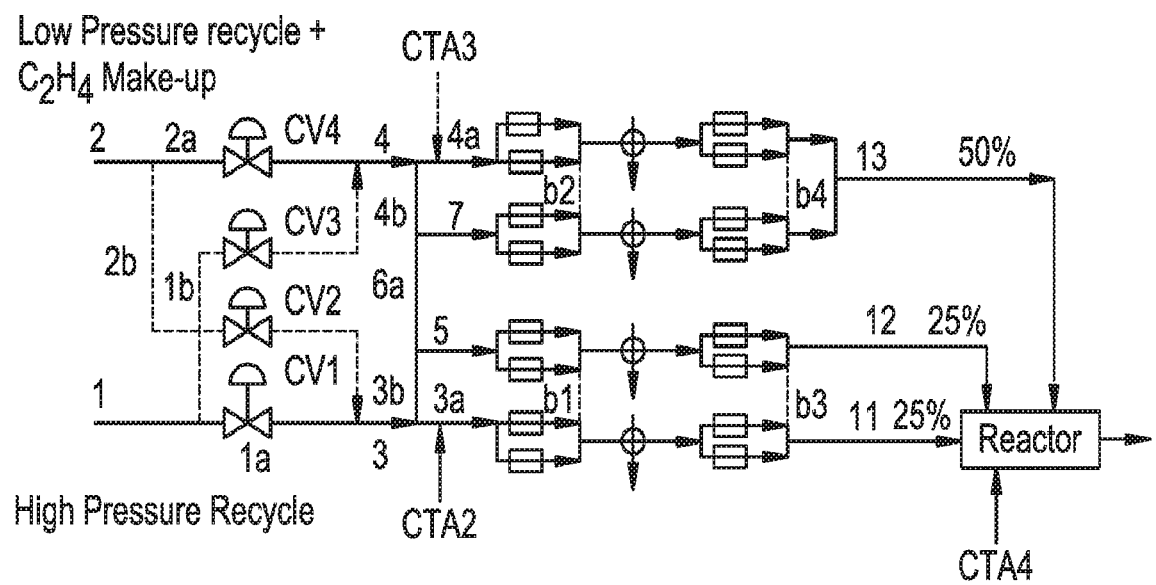
FIG. 8b is Hyper compressor system layout with 16 (2×8) plungers for 25/25/50/0 ethylene based feed distribution CTA (IP12.1, IP12.2, IP12.3, IP13.1, IP13.2 and IP13.3).
Figure 9:
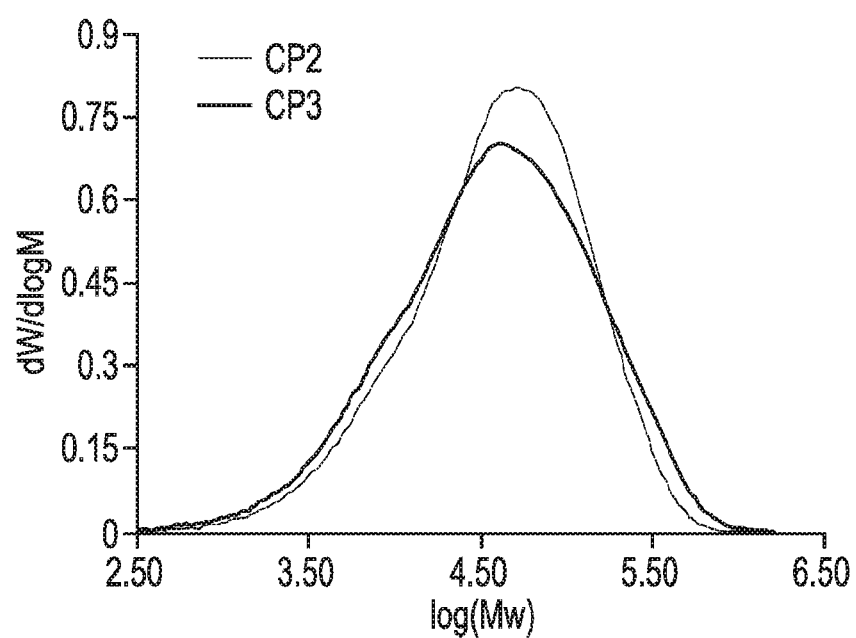
FIG. 9 depicts the GPC profiles for CP2 and CP3 examples.

Process Flow Diagram for IP12.1, IP12.2, IP12.3, IP13.1, IP13.2 and IP13.3 (FIG. 8b)—FIG. 8b shows the flow scheme with three-ethylene based reactor feed distribution (25/25/50/0). The Hyper compressor system has six cylinders of which eight cylinders are each installed in the first and second stages. The suction lines 3a, 5, 7 and 4a and the interstage lines 8, 9, 10a and 10 are each handling 20% of the total ethylene based flow, while the discharge or reactor feed lines 11, 12 and 13 are handling 25%, 25% and 50% of the total compressed ethylene based flow. Lines 3b, 6 and 4b are the balancing flow line before sending to the suction of the Hyper compressor system. Optionally balancing lines (b1, b2, b3 and/or b4) can be installed to reduce the pressure and/or flow pulsation in lines 8, 9, 10a, 10, 11, 12 and/or 13. Line 8, 9, 10a and 10 show the Hyper compressor system interstage lines with interstage coolers. Line 8, 9, 10a and 10 show the Hyper compressor system interstage lines with interstage coolers. Description without distribution control system (FIG. 8b) 1a, 1b, 2a, 2b, CV1, CV2, CV3 and CV4. The HPR flow with high concentration of CTA (line 1 and 1a) is primarily sent to the suction of the Hyper compressor system through lines 3a and 5, while the LPR flow/make-up ethylene (low CTA concentration, line 2 and 2a) is mainly sent to the suction of the Hyper compressor system through line 4a. The remaining flow from HPR (line 6) is combined with the remaining flow from LPRflow/make-up and is sent to the suction of the Hyper compressor system through line 7. The discharge flows 11, 12 and 13 are receiving 25%, 25% and 50% of the total compressed ethylene based feed flow. Make-up CTA can be added into the suction of the Hyper compressor system (CTA2 and/or CTA3) or directly fed to the first reaction zone (CTA4) thus enhancing CTA level at the first reaction zone. This configuration in combination with CTA injection through CTA2 and/or CTA4 is preferred for making narrow MWD polymers. An optional distribution control system (FIG. 8b), consisting for example of 1b, 2b, CV1, CV2, CV3 and CV4, can be installed and used. CV1, CV2, CV3 and CV4 are control valves in line 1a, 2b, 1b and 2a to distribute line 1 and 2 over line 3a, 5, 7 and 4a. This potential reversed distribution of 1 and 2 through line 1b and 2b over 3a, 5, 7 and 4a expands the MWD capability from very narrow to very broad and in between MWD polymers. Make-up CTA can be added into the suction of the Hyper compressor system (CTA2 and/or CTA3).

Discussion of representative example control system, as depicted option in FIG. 5b—CV1, CV2, CV3 and CV4 are control valves. 1a and 1b are lines to change/control the distribution of stream 1 and stream 5 over the suction flows 5, 6a and 7 of the Hyper compressor system level. The following control scenarios of distributing stream 1 and 2 over the Hyper compressor system suction stream 5, 6a and 7 are possible:

A. When CV2 and CV3 are closed line 5 will receive an ethylene-based flow from line 1 and line 7 will receive an ethylene-based flow from stream 2. Stream 6a will ethylene-based flows from stream 1 and optionally stream 2;

B. When CV1 and CV4 are closed line 5 will receive an ethylene-based flow from line 2 and line 7 will receive an ethylene-based flow from stream 1. Stream 6a will receive ethylene-based flows from stream 1 and optionally stream 2;

C. When the position of CV1, CV2, CV3 and CV4 are controlled stream 1 and stream 2 can be freely distributed over line 5 and 7, while stream 6a will receive ethylene-based flows from stream 1 and stream 2.

Derivation of the Relative Distribution of Make-Up Ethylene and Overall CTA Over the Reactor Feed Streams Through Establishing the Relative Mass Balances of C2= and CTA (IP8.1 Example as a Representative Example)

Table 2 shows the derivation of ethylene and CTA distribution over the reactor feed streams as used for in IP8.1 example. This example makes use of the process flow scheme depicted in FIG. 5c for a 14 cylinder Hyper compressor system with a three ethylene based feed flow distribution (25/25/50/0). The first stage comprises of six cylinders, divided into three groups of two cylinders, in which each group receives 33% of the total ethylene based feed distribution. However, major flow from HPR and LPR are subsequently sent to line 5 and line 7 while the combined remaining flow is sent to line 6a. Line 5, 6a and 7 are then sent to different reaction zones resulting in differentiated CTA level.

In the relative mass balance calculations both the overall amount of ethylene and CTA sent to the reactor were set at 100%. In the relative mass balance calculations both the overall amount of ethylene and CTA sent to the reactor were set at 100%. The relative make-up amount of ethylene is equal to the conversion in the reactor plus % ethylene purged. A similar calculation was followed for the CTA. FE1, FE2 and FE3 represent the relative weight fraction of make-up C2=, while FRZ1, FRZ2 and FRZ3 represent relative weight fraction of make-up CTA fed in the reactor feed streams. With the help of the relative amounts of CTA in the reactor feed streams the relative concentrations in the cumulative CTA fed to a reaction zone can be calculated. Z1, Z2 and Z3 represent the cumulative relative concentration of CTA to the corresponding reaction zones. In the IP8.1 example, the assumptions of ethylene conversion, ethylene purge and entrainment in polymer sent to the LPR of 28%, 2% and 6.2% (22% ethylene entrainment into polymer x 28% C2= conversion), have been made. Make-up ethylene is a total flow of C2= converted into polymer, purge and C2= flow sent to the LPR. The make-up CTA is a total flow of converted CTA and purge flow (CTA for each stream can be found in Table 2).

TABLE 2

Derivation of the relative distribution of make-up Ethylene and overall CTA over the reactor feed streams to reaction zones (IP8.1).

| Example | C2= | CTA |
|---|---|---|
| Conversion | 28% | 0.283 × 28% = 7.9% |
| Purge to LHC | 2% | 0.283 × 92.1 % = 2.6% |
| Make-up flow feed | 28% + 2% = 30% | 7.9% + 2.6% = 10.5% |
| Total recycle + purge | 100% − 28% = 72% | 100% − 7.9% = 92.1% |
| Total recycle | 100% − 30% = 70% | 100% − 10.5% = 89.5% |
| Entrainment C2 = in polymer | 22% | |
| LPR (line 2) | 22% × 28% = 6.2% | |
| HPR (line 1) | 70% − 6.2% = 63.8% | |
| Line 2b | 0% | 0% |
| Line 1b | 0% | 0% |
| Stream 3 (line 1 − line 5) | 63.8% − 33.3% = 30.5% | 81.6% × 30.5%/63.8% = 39% |

TABLE 2-continued

Derivation of the relative distribution of make-up Ethylene and overall CTA over the reactor feed streams to reaction zones (IP8.1).

| Example | C2= | CTA |
|---|---|---|
| Stream 4 (line 2 − line 7) | 30% + 6.2% − 33.3% = 2.9% | 7.9% × 2.9%/(30% + 6.2%) = 0.6% |
| Stream 5 | 33.3% | 81.6% × 33.3%/63.8% = 39.6% |
| Stream 6 a(line 3 + line 4) | 2.9% + 30.5% = 33.3% | 39% + 0.6% = 39.6% |
| Stream 7 | 33.3% | 7.9% × 33.3%/(30% + 6.2%) = 7.3% |
| Stream 8 (equal to line 5) | 25.0% | 39.6% + 10.5% = 53.1% |
| Stream 9 (equal to line 6) | 33.3% | 39.6% |
| Stream 9a (50% of line 9) | 33.3%/2 = 16.7% | 39.6% × 16.7%/33.3% = 19.8% |
| Stream 9b (50% of line 9) | 33.3% − 16.7% = 16.7% | 39.6*16.7/33.3% = 19.8% |
| Stream 10 (equal to line 7) | 33.3% | 7.30% |
| Stream 11 (come from line 8) | 25% | 53.1% × 25%/33.3 % = 39.8% |
| Stream 12 (line 8 − line 11 + line 9a) | (33.3% − 25%) + 16.7% = 25% | (53.1%-39.8%) + 19.8% = 33.1% |
| Stream 13 (line 10 + line 9b) | 33.3% + 16.7% = 50% | 7.3% + 19.8% = 27.1% |
| Component distribution FRX1 | FE1 = 0 | FRZ1 = 39.8*/25% = 1.59 |
| Component distribution FRX1 | FE2 = 0 | FRZ2 = 33.1%/25% = 1.32 |
| Component distribution FRX1 | FE3 = 30%/(30% + 6.2%) = 0.83 | FRZ3 = 27.1%/50% = 0.54 |
| | | Z1 = 1.59*15%/25% |
| | | Z2 = (1.59 × 25% + 1.32 × 25%)/(25% + 25%) = 1.45 |
| | | Z3 = 1.59 × 25% + 1.32 × 25% + 0.54 × 50%/(25% + 25% + 50%) = 1.0 |
| | FE1/FE2 = 0/0 = Non-define | Z1/Z2 = 1.59/1.45 = 1.09 |
| | FE1/FE3 = 0/0.83 = 0 | Z1/Z3 = 1.59/1.0 = 1.59 |
| Feed from Primary to RX1 | 0% | |
| Feed from Primary to RX2 | 0% | |
| Feed from Primary to RX3 | 30% + 6.2% = 36.2% | |
| Feed 1 | 0/25% = 0 | |
| Feed 2 + 3 | (0% + 36.2%)/(50% + 25%) = 48.2% | |
| Feed 3 | 36.2%/50% = 72.4% | |

Comparative Polymerizations for Tubular Reactor: CP2 and CP3 (Actual Polymerizations)

The CP2 and CP3 polymerizations use three ethylene based feeds distributed over a three reaction zone system (50/35/15). In CP2, LPR/make-up ethylene is mainly distributed over the reaction zones 2 and 3 while a major part of from HPR together with make-up CTA is primarily sent to the first reaction zone (see FIG. 2), resulting in high CTA concentration in the front of the reactor system. A reversed operation in which all LPR/make-up ethylene is sent to the first reaction zone while all HPR flow with make-up CTA is sent to the subsequent reaction zones, resulting in low CTA concentration in the first reaction zone. As shown in Tables 6a and 6b, the final CTA distribution between the first and the last ethylene based flows (Z1/Z3) to the reaction zones is 1.37 and 0.71 for CP2 and CP3, respectively, corresponding to an increase in MWD (Mw/Mn) from 4.8 to 5.8, in melt elasticity from 1.2 to 2.3 cN and in G' from 67 to 99 Pa at 170 C. It can be concluded that the distribution of ethylene based flows coming from HPR and Primary compressor system (LPR/make-up ethylene) to the first reaction zone will strongly affect produced polymers in regard to MWD parameters and rheological properties as melt elasticity and G'. Process conditions and Product characterization results are shown in Tables 6a and 6b.

Comparative Polymerizations for Tubular Reactor: CP4 through CP13—CP4 through CP7 use a Hyper compressor system that comprises multiple cylinders (10 cylinders for CP4 and CP5, 12 cylinders for CP6 and CP7) arranged for the first and second compression stages, which are applied for the reactor configuration of 33/33/33 (see FIG. 4a and FIG. 5a). CP8 through CP11 shows the Hyper compressor system comprises of fourteen cylinders (6 cylinders in the first stage and 8 cylinders in the second stage), see FIGS. 6a and 7a, while sixteen cylinders (each stage comprising 8 cylinders) are used for CP12 and CP13 (see FIG. 8a). Examples CP8 through CP13 are used for 25/25/50/0 reactor configuration. As shown in FIGS. 4a through 7a, the HPR and LPR/make-up ethylene flows are combined into line 6 before distributed to the first stage of the Hyper compressor system. The make-up CTA (CTA1) is added into line 6 resulting in even CTA distribution. However, the make-up CTA (CTA3, CTA4) is added to differentiate the CTA concentration in the first reaction zone. Detail calculations of mass balance (with CTA1) of each stream can be found in Table 3 through Table 7 for the ethylene conversion of 28% and 38% respectively.

TABLE 3

Make-up ethylene and make-up CTA distrib. applied for examples. Conv. in wt %

| Ethylene based feed distribution | Ex. | FE1 | FE2 | FE3 | FE1/FE2 | FE1/FE3 | Z1 | Z2 | Z3 | Z1/Z2 | Z1/Z3 |
|---|---|---|---|---|---|---|---|---|---|---|---|
| 100/0/0/0 | CP1 | 0.3 | NA | NA | NA | NA | 1.00 | NA | NA | NA | NA |
| 33/33/33/0 | CP4 | 0.30 | 0.30 | 0.30 | 1.00 | 1.00 | 1.00 | 1.00 | 1.00 | 1.00 | 1.00 |
| | IP4.1 | 0.00 | 0.30 | 0.60 | 0.00 | 0.00 | 1.49 | 1.24 | 1.00 | 1.20 | 1.49 |
| | IP4.2 | 0.00 | 0.30 | 0.60 | 0.00 | 0.00 | 1.59 | 1.24 | 1.00 | 1.28 | 1.59 |

TABLE 3-continued

Make-up ethylene and make-up CTA distrib. applied for examples. Conv. in wt %

| Ethylene based feed distribution | Ex. | FE1 | FE2 | FE3 | FE1/FE2 | FE1/FE3 | Z1 | Z2 | Z3 | Z1/Z2 | Z1/Z3 |
|---|---|---|---|---|---|---|---|---|---|---|---|
| | IP4.3 | 0.60 | 0.30 | 0.00 | 2.00 | Infinitive | 0.51 | 0.76 | 1.00 | 0.68 | 0.51 |
| | CP5 | 0.40 | 0.40 | 0.40 | 1.00 | 1.00 | 0.50 | 0.50 | 0.50 | 1.00 | 1.00 |
| | IP5.1 | 0.00 | 0.40 | 0.80 | 0.00 | 0.00 | 1.71 | 1.36 | 1.00 | 1.26 | 1.71 |
| | IP5.2 | 0.00 | 0.40 | 0.80 | 0.00 | 0.00 | 1.85 | 1.36 | 1.00 | 1.36 | 1.85 |
| | IP5.3 | 0.80 | 0.40 | 0.00 | 2.00 | Infinitive | 0.29 | 0.64 | 1.00 | 0.45 | 0.29 |
| 33/33/33/0 | CP6 | 0.30 | 0.30 | 0.30 | 1.00 | 1.00 | 1.00 | 1.00 | 1.00 | 1.00 | 1.00 |
| | IP6.1 | 0.00 | 0.07 | 0.83 | 0.00 | 0.00 | 1.59 | 1.39 | 1.00 | 1.15 | 1.59 |
| | IP6.2 | 0.83 | 0.07 | 0.00 | 11.79 | Infinitive | 0.22 | 0.70 | 1.00 | 0.31 | 0.22 |
| | CP7 | 0.40 | 0.40 | 0.40 | 1.00 | 1.00 | 1.00 | 1.00 | 1.00 | 1.00 | 1.00 |
| | IP7.1 | 0.00 | 0.37 | 0.83 | 0.00 | 0.00 | 1.85 | 1.38 | 1.00 | 1.34 | 1.85 |
| | IP7.2 | 0.83 | 0.37 | 0.00 | 2.22 | Infinitive | 0.25 | 0.58 | 1.00 | 0.43 | 0.25 |
| 25/25/50/0 | CP8 | 0.30 | 0.30 | 0.30 | 1.00 | 1.00 | 1.00 | 1.00 | 1.00 | 1.00 | 1.00 |
| | IP8.1 | 0.00 | 0.00 | 0.83 | Non-defined | 0.00 | 1.59 | 1.46 | 1.00 | 1.09 | 1.59 |
| | IP8.2 | 0.00 | 0.00 | 0.83 | Non-defined | 0.00 | 1.70 | 1.46 | 1.00 | 1.16 | 1.70 |
| | IP8.3 | 0.83 | 0.32 | 0.02 | 2.56 | 35.38 | 0.22 | 0.54 | 1.00 | 0.40 | 0.22 |
| | CP9 | 0.40 | 0.40 | 0.40 | 1.00 | 1.00 | 1.00 | 1.00 | 1.00 | 1.00 | 1.00 |
| | IP9.1 | 0.00 | 0.00 | 0.83 | Non-defined | 0.00 | 1.85 | 1.53 | 1.00 | 1.21 | 1.85 |
| | IP9.2 | 0.00 | 0.00 | 0.83 | Non-defined | 0.00 | 1.98 | 1.53 | 1.00 | 1.29 | 1.98 |
| | IP9.3 | 0.83 | 0.52 | 0.12 | 1.58 | 6.65 | 0.25 | 0.73 | 1.29 | 0.34 | 0.19 |
| 25/25/50/0 | CP10 | 0.30 | 0.30 | 0.30 | 1.00 | 1.00 | 1.00 | 1.00 | 1.00 | 1.00 | 1.00 |
| | IP10.1 | 0.00 | 0.00 | 0.60 | Non-defined | 0.00 | 1.49 | 1.49 | 1.00 | 1.00 | 1.49 |
| | IP10.2 | 0.00 | 0.00 | 0.60 | Non-defined | 0.00 | 1.70 | 1.49 | 1.00 | 1.14 | 1.70 |
| | IP10.3 | 0.60 | 0.60 | 0.00 | 1.00 | Infinitive | 0.51 | 0.51 | 1.00 | 1.00 | 0.51 |
| | CP11 | 0.40 | 0.40 | 0.40 | 1.00 | 1.00 | 1.00 | 1.00 | 1.00 | 1.00 | 1.00 |
| | IP11.1 | 0.00 | 0.00 | 0.80 | Non-defined | 0.00 | 1.71 | 1.71 | 1.00 | 1.00 | 1.71 |
| | IP11.2 | 0.00 | 0.00 | 0.80 | Non-defined | 0.00 | 1.98 | 1.71 | 1.00 | 1.16 | 1.98 |
| | IP11.3 | 0.80 | 0.80 | 0.00 | 1.00 | Infinitive | 0.29 | 0.29 | 1.00 | 1.00 | 0.29 |
| 25/25/50/0 | CP12 | 0.30 | 0.30 | 0.30 | 1.00 | 1.00 | 1.00 | 1.00 | 1.00 | 1.00 | 1.00 |
| | IP12.1 | 0.00 | 0.00 | 0.60 | Non-defined | 0.00 | 1.70 | 1.49 | 1.00 | 1.14 | 1.70 |
| | IP12.2 | 0.00 | 0.00 | 0.60 | Non-defined | 0.00 | 1.70 | 1.49 | 1.00 | 1.14 | 1.70 |
| | IP12.3 | 0.83 | 0.37 | 0.00 | 2.24 | Infinitive | 0.22 | 0.51 | 1.00 | 0.43 | 0.22 |
| | CP13 | 0.40 | 0.40 | 0.40 | 1.00 | 1.00 | 1.00 | 1.00 | 1.00 | 1.00 | 1.00 |
| | IP13.1 | 0.00 | 0.00 | 0.80 | Non-defined | 0.00 | 1.98 | 1.71 | 1.00 | 1.16 | 1.98 |
| | IP13.2 | 0.00 | 0.00 | 0.80 | Non-defined | 0.00 | 1.98 | 1.71 | 1.00 | 1.16 | 1.98 |
| | IP13.3 | 0.83 | 0.77 | 0.00 | 1.07 | Infinitive | 0.25 | 0.29 | 1.00 | 0.86 | 0.25 |

CPx used in the example with CTA1 in the flow scheme.
IPx.1 and x.2 used for the inventive polymers examples with CTA2 and CTA4 in the flow scheme.
IPx.3 used for the inventive polymers examples with CTA3 in the flow scheme.
For examples CP4, CP6, CP8, CP10, CP12, IP4.1, IP4.2, IP4.2, IP6.1, IP6.2, IP6.3, IP8.1, IP8.2, IP8.3, IP10.1, IP10.2, IP10.3, IP12.1, IP12.2, IP12.3, the conversion is 28.0%.
For examples CP5, CP7, CP9, CP11, CP13, IP5.1, IP5.2, IP5.2, IP7.1, IP7.2, IP7.3, IP9.1, IP9.2, IP9.3, IP11.1, IP11.2, IP11.3, IP13.1, IP13.2, IP13.3, the conversion is 38.0%.

TABLE 4

Primary output flow distribution over the reaction zone 1 (Feed 1), Reaction zones 2 + 3 (Feed 2 + 3) and reaction zone 3 (Feed 3) Values can be maximal 100%.

| | | | | Conversion (wt %) | | | | | |
|---|---|---|---|---|---|---|---|---|---|
| | | | | 28% | 38% | 28% | 38% | 28% | 38% |
| | wt % Primary output in Feeds | | | Feed 1 | | Feed 2 + 3 | | Feed 3 | |
| Ex. | Feed 1 | Feed 2 + 3 | Feed 3 | Max. wt % ee-based feed from the output of the Primary Comp. System | | | | | |
| CP1 | 100% | 0% | 0% | 100% | 100% | NA | NA | NA | NA |
| CP4 | 36% | 36% | 36% | 100% | | 56% | | 100% | |
| IP4.1 | 0% | 54% | 72% | | | | | | |
| IP4.2 | 0% | 54% | 72% | | | | | | |
| IP4.3 | 72% | 18% | 0% | | | | | | |
| CP5 | 48% | 48% | 48% | | 100% | | 74% | | 100% |
| IP5.1 | 0% | 73% | 97% | | | | | | |
| IP5.2 | 0% | 73% | 97% | | | | | | |
| IP5.3 | 97% | 24% | 0% | | | | | | |
| CP6 | 36% | 36% | 36% | 100% | | 56% | | 100% | |
| IP6.1 | 0% | 54% | 100% | | | | | | |
| IP6.2 | 100% | 4% | 0% | | | | | | |
| CP7 | 48% | 48% | 48% | | 100% | | 74% | | 100% |
| IP7.1 | 0% | 73% | 100% | | | | | | |
| IP7.2 | 100% | 23% | 0% | | | | | | |
| CP8 | 36% | 36% | 36% | 100% | | 49% | | 100% | |
| IP8.1 | 0% | 48% | 72% | | | | | | |

TABLE 4-continued

Primary output flow distribution over the reaction zone 1 (Feed 1), Reaction zones 2 + 3 (Feed 2 + 3) and reaction zone 3 (Feed 3) Values can be maximal 100%.

| | wt % Primary output in Feeds | | | Conversion (wt %) | | | | | |
|---|---|---|---|---|---|---|---|---|---|
| | | | | 28% | 38% | 28% | 38% | 28% | 38% |
| | | | | Feed 1 | | Feed 2 + 3 | | Feed 3 | |
| Ex. | Feed 1 | Feed 2 + 3 | Feed 3 | Max. wt % ee-based feed from the output of the Primary Comp. System | | | | | |
| IP8.2 | 0% | 48% | 72% | | | | | | |
| IP8.3 | 100% | 15% | 0% | | | | | | |
| CP9 | 48% | 48% | 48% | 100% | | 66% | | 100% | |
| IP9.1 | 0% | 64% | 97% | | | | | | |
| IP9.2 | 0% | 64% | 97% | | | | | | |
| IP9.3 | 100% | 31% | 0% | | | | | | |
| CP10 | 36% | 36% | 36% | 100% | | 49% | | 100% | |
| IP10.1 | 0% | 48% | 72% | | | | | | |
| IP10.2 | 0% | 48% | 72% | | | | | | |
| IP10.3 | 72% | 24% | 0% | | | | | | |
| CP11 | 48% | 48% | 48% | 100% | | 66% | | 100% | |
| IP11.1 | 0% | 64% | 97% | | | | | | |
| IP11.2 | 0% | 64% | 97% | | | | | | |
| IP11.3 | 97% | 32% | 0% | | | | | | |
| CP12 | 36% | 36% | 36% | 100% | | 49% | | 100% | |
| IP12.1 | 0% | 48% | 72% | | | | | | |
| IP12.2 | 0% | 48% | 72% | | | | | | |
| IP12.3 | 100% | 15% | 0% | | | | | | |
| CP13 | 48% | 48% | 48% | 100% | | 66% | | 100% | |
| IP13.1 | 0% | 64% | 97% | | | | | | |
| IP13.2 | 0% | 64% | 97% | | | | | | |
| IP13.3 | 100% | 30% | 0% | | | | | | |

TABLE 5

Influence of Hyper compressor system line-up and conv. level on the CTA distrib.

Hyper compressor system: # of cylinders

| Total # of cylinders | Total # of 1st stage cylinders | Total # of 2nd stage cylinders | Flow scheme FIG. | Reactor configuration | Example | Z1/Z3 Min | Z1/Z3 Max | Optional control |
|---|---|---|---|---|---|---|---|---|
| Conversion level is 28.2 wt % | | | | | | | | |
| 16 | 8 | 8 | FIG. 2, 3 | 50/35/15 | CP2-CP3 | 0.71 | 1.37 | None |
| Conversion level is 28 wt % | | | | | | | | |
| 10 | 4 | 6 | FIG. 4b | 33/33/33/0 | IP4.1 toIP4.3 | 0.51 | 1.59 | 0.51-1.59 |
| 12 | 6 | 6 | FIG. 5b | 33/33/33/0 | IP6.1-IP6.2 | 0.22 | 1.59 | 0.22-1.59 |
| 14 | 6 | 8 | FIG. 6b | 25/25/50/0 | IP8.1-IP8.3 | 0.22 | 1.7 | 0.22-1.70 |
| 14 | 6 | 8 | FIG. 7b | 25/25/50/0 | IP10.1-IP10.3 | 0.51 | 1.7 | 0.51-1.70 |
| 16 | 8 | 8 | FIG. 8b | 25/25/50/0 | IP12.1-IP 12.3 | 0.22 | 1.7 | 0.22-1.70 |
| Conversion level is 38 wt % | | | | | | | | |
| 10 | 4 | 6 | FIG. 4b | 33/33/33/0 | IP5.1-IP5.3 | 0.29 | 1.85 | 0.29-1.85 |
| 12 | 6 | 6 | FIG. 5b | 33/33/33/0 | IP7.1-IP7.2 | 0.25 | 1.85 | 0.25-1.85 |
| 14 | 6 | 8 | FIG. 6b | 25/25/50/0 | IP9.1-IP9.3 | 0.19 | 1.98 | 0.19-1.98 |
| 14 | 6 | 8 | FIG. 7b | 25/25/50/0 | IP11.1-IP11.3 | 0.29 | 1.98 | 0.29-1.98 |
| 16 | 8 | 8 | FIG. 8b | 25/25/50/0 | IP13.1-IP13.3 | 0.25 | 1.98 | 0.25-1.98 |

TABLE 6a

Process conditions used for CP2 and CP3

| Example | Inlet pressure/ bar | Start temp./ °C. | Max. reaction temp in each zone | Throughput/ tons · hr$^{-1}$ | Polymer output/ tons · hr$^{-1}$ | CTA activity (Cs) |
|---|---|---|---|---|---|---|
| CP2 | 2150 | 145/152/196 | 293/293/293 | 56.4 | 15.9 | 0.33 |
| CP3 | 2140 | 145/159/197 | 292/294/294 | 56.1 | 15.8 | 0.33 |

TABLE 6b

| | Polymer product properties | | | | | | |
|---|---|---|---|---|---|---|---|
| Example | Melt index g/dmin | Z1/Z2 | Z1/Z3 | Density (annealed) g/cc | G' (G" = 500 Pa, 170 C.) Pa | Melt elasticity cN | Mw/Mn |
| CP2 | 4.36 | 1.37 | 1.37 | 0.9246 | 67 | 1.2 | 4.8 |
| CP3 | 4.14 | 0.71 | 0.71 | 0.9239 | 99 | 2.3 | 5.8 |

Inventive Polymerization IP4.1 Through IP13.3.

The inventive line-ups of suction, interstage and discharge flows of Hyper comp. systems, as described in IP4.1 to IP13.3, show the extreme HPR and LPR/make-up ethylene-based distribution to the first and the third reaction zones, to achieve the desired capability and flexibility in polymer MWD and rheological properties. For instance, maximizing CTA concentration to the first reaction zone (receiving from HPR combined with make-up CTA distribution; see the higher values (>1) for Z1/Z2 and Z1/Z3 ratios in Table 3) allows for very narrow MWD polymers, while lowering CTA concentration in the first reaction zone (see lower values (<1) for Z1/Z2 and Z1/Z3 ratios in Table 3) results in very broad MWD polymers.

These extreme operations for very narrow MWD (IP4.1, IP4.2, IP5.1, IP5.2, IP6.1, IP6.2, IP7.1, IP7.2, IP8.1, IP8.2, IP9.1, IP9.2, IP10.1, IP10.2, IP11.1, IP11.2, IP12.1, IP12.2, IP13.1, IP13.3) are done, wherein CV1 and CV4 are fully opened, while CV2 and CV3 are fully closed. On the other hand, broad MWD polymers are produced by fully opening CV2 and CV3, while closing CV1 and CV4, as for IP4.3, IP5.3, IP6.3, IP7.3, IP8.3, IP9.3, IP10.3, IP11.3, IP12.3, IP13.3. The design of the Hyper comp. system, for example, the line-up of the cylinders in the first and second stages, are important to maintain the preferred distribution the HPR ethylene and LPR/make-up ethylene mixture, through the Hyper comp. system interstage and discharge to the reaction zones, in order to achieve the maximum capability and flexibility in MWD and rheological properties. Summary of the relative make-up ethylene and total CTA distribution—see Tables 3, 4 and 5. The importance of the Z1/Zn ratios are shown in the above simulation examples, as well as in the actual polymerization examples, Optionally, CV1, CV2, CV3 and CV4 are control valves; 1a and 1b are lines to change/control the distribution of stream 1 and stream 5 over the suction flows 5, 6 and 7 of the Hyper comp. system level. The following control scenarios of distributing stream 1 and 2 over the Hyper comp. system suction stream 5, 6 and 7 are possible: A) When CV2 and CV3 are closed line 5 will receive an ethylene-based flow from line 1 and line 7 will receive an ethylene-based flow from stream 2. Stream 6a is ethylene-based flows from stream 1 and optionally stream 2; B) When CV1 and CV4 are closed, line 5 will receive an ethylene-based flow from line 2, and line 7 will receive an ethylene-based flow from stream 1. Stream 6a will receive ethylene-based flows from stream 1 and optionally stream 2; C) When the position of CV1, CV2, CV3 and CV4 are controlled, stream 1 and stream 2 can be freely distributed over line 5 and 7, while stream 6a will receive ethylene-based flows from stream 1 and stream 2. Through scenario A, B or C, the desired capability of a plant to meet the product properties (optics, rheology melt strength, MWD) will, beside preferred line-up, also influence the design, of the Hyper system, such as the number of plungers and pressure range.

The influence of Hyper comp. system line-ups, at different conversion levels, on the overall CTA distribution is shown in Table 5. It shows surprisingly that each comp. system having different numbers of cylinders, flow line-ups in the suction and discharge side of the first and second compression stages, while using the same reactor configuration, the Z1/Zi range can be widened beyond CP2 and CP3. This indicates improved MWD capability both at the broad MWD side (Z1/Z3 <1) as well as the narrow MWD side (Z1/Z3>1). The inventive line-ups can also be used to make same MWD polymers at higher conversion level. See Table 5 for details on Z1/Z3 and optional Z1/Z3 operational range. Also, combining the inventive Hyper compressor system line-ups with the inventive control allows to control the Z1/Z3 values between the minimum and maximum boundary values. This will give full control in the range of the MWD values derived with the minimum and the maximum Z1/Z3 values without changing other process conditions. The distribution of the output of the Primary comp. system, the flow of the HPR and the make-up CTA distribution is very important for achieving narrow or broad MWD capability, and associated rheological properties (e.g., melt elasticity and G'). The inventive line-ups of Hyper comp. systems, in regard to suction, interstage and discharge flows, enhance and preserve the desired capability of MWD. Furthermore by combining the inventive compressor line-ups, with an inventive system to, control the distribution of the Primary comp. system output and the flow coming from the HPR, maximum capability in MWD is achieved, as well maximum flexibility and control of all MWD's (from the minimum narrow MWD to the maximum broad MWD). For each Hyper comp. system design, regardless of numbers of cylinders in the overall system, in the first compression and/or in subsequent compression stages, an inventive compressor line-up can be defined to achieve maximum capability and flexibility in CTA conc. over the reactor feed streams, and consequently polymer properties, such as MWD and rheology. Also, the inventive line-ups allows reduction and minimization of pulsation and vibration levels in the combined discharge lines, from the compressor interstage and discharge section, by preferential combining opposing cylinders and/or the use of balancing lines.

The invention claimed is:

1. A high pressure polymerization process to form an ethylene-based polymer, the process comprising at least the following steps:
   polymerizing a reaction mixture comprising ethylene, using a reactor system comprising at least three ethylene-based feed streams and a reactor configuration that comprises at least four reaction zones, and
   wherein at least one of the following distributions a) through c), is met:

(a) up to 100 wt % of the ethylene-based feed stream to a first reaction zone of the four reaction zones comes from a high pressure recycle, and/or up to 100 wt % of a last ethylene-based feed stream to a reaction zone comes from an output from a Primary compressor system; and/or (b) up to 100 wt % of the ethylene-based feed stream to the first reaction zone comes from the output from a Primary compressor system, and/or up to 100 wt % of the last ethylene-based feed stream to a reaction zone comes from the high pressure recycle; and/or (c) the ethylene-based feed stream to the first reaction zone, and/or the last ethylene-based feed stream to a reaction zone, each comprises a controlled composition;

and wherein each ethylene-based feed stream to a reaction zone, independently, receives an output from two or more cylinders of a last compressor stage of a Hyper compressor system;

and wherein the ethylene-based feed stream to the first reaction zone is from 20 wt % to 60 wt % of the total ethylene-based feed stream to the reactor configuration; and wherein the sum of the last two ethylene-based feed streams to the reactor configuration is from 20 wt % to 80 wt % of the total ethylene-based feed streams to the reactor configuration.

2. The process of claim 1, wherein the weight percent of ethylene-based feed flow, from the output of the Primary compressor system, and in the feed to the first reaction zone is varied using the smaller of range i) or range ii) as follows:

i) the ethylene-based feed flow from the output of the Primary compressor system is from 0 wt % to 100 wt %;

ii) the ethylene-based feed flow from the output of the Primary compressor system is from 0 wt %, to a value determined by the following equation:

$$\frac{[(\text{Conversion} \times 1.25) + \text{purge}]}{X} \times 100 \text{ wt \%},$$

wherein X is the percentage of the ethylene-based feed stream to the first reaction zone, based on the total amount of ethylene-based streams to the reactor configuration, and the "conversion (in wt %)" is the "polymer output divided by the total feed flow to the reactor configuration," and the purge from the high pressure recycle is in wt %.

3. The process of claim 1, wherein the weight percent of ethylene-based feed flow, from the output of the Primary compressor system, and in the feed to the last two reaction zone, receiving an ethylene-based feed stream, is varied using the smaller range i) or ii) as follows:

i) the ethylene-based feed flow from the output of the Primary compressor system is from 0 wt % to 100 wt %;

ii) the ethylene-based feed flow from the output of the Primary compressor system is from 0 wt % to a value defined by the following equation:

$$\frac{[(\text{Conversion} \times 1.25) + \text{purge}]}{Y} \times 100\% \text{ wt},$$

wherein Y is the percentage of the ethylene-based feed stream to the last two reaction zones, receiving an ethylene-based feed, based on the total amount of ethylene-based streams to the reactor configuration, and the "conversion (in wt %)" is the "polymer output divided by the total feed flow to the reactor configuration," and the purge from the high pressure recycle is in wt %.

4. The process of claim 1, wherein the weight percent of ethylene-based feed flow, from the output of the Primary compressor system, and in the feed to the last reaction zone, receiving an ethylene-based feed stream, is varied using the smaller range i) or ii) as follows:

i) from 0 wt % to 100 wt %, or ii) from 0 wt % to a value determined by the following equation:

$$\frac{\text{Conversion} \times 1.25 + \text{wt \% purge}}{W} \times 100\% \text{ wt},$$

wherein W is the percentage of the ethylene-based feed stream to the last reaction zone, receiving an ethylene-based feed, based on the total amount of ethylene-based streams to the reactor configuration, and the "conversion (in wt %)" is the "polymer output divided by the total feed flow to the reactor configuration," and the purge from the high pressure recycle is in wt %.

5. The process of claim 1, wherein the compositions of the ethylene-based feed streams going to the first and last reaction zones, each receiving an ethylene-based feed, are each controlled with a control system comprising a valve system, through which an ethylene-based feed stream is flowed, to be later compressed and/or delivered to the respective reaction zone.

6. The process of claim 1, wherein the reactor system further comprises at least one analyzer for detecting a component of a stream of the reactor configuration or determining a property of the ethylene-based polymer produced by the high pressure polymerization process.

7. The process of claim 1, wherein the reactor configuration comprises at least one tubular reactor.

8. The process of claim 2, wherein the weight percent of ethylene-based feed flow, from the output of the Primary compressor system, and in the feed to the last two reaction zones, receiving an ethylene-based feed stream, is varied using the smaller range i) or ii) as follows:

i) the ethylene-based feed flow from the output of the Primary compressor system is from 0 wt % to 100 wt %;

ii) the ethylene-based feed flow from the output of the Primary compressor system is from 0 wt % to a value defined by the following equation:

$$\frac{[(\text{Conversion} \times 1.25) + \text{purge}]}{Y} \times 100\% \text{ wt},$$

wherein Y is the percentage of the ethylene-based feed stream to the last two reaction zones, receiving an ethylene-based feed, based on the total amount of ethylene-based streams to the reactor configuration, and the "conversion (in wt %)" is the "polymer output divided by the total feed flow to the reactor configuration," and the purge from the high pressure recycle is in wt %.

* * * * *

UNITED STATES PATENT AND TRADEMARK OFFICE
CERTIFICATE OF CORRECTION

PATENT NO. : 11,078,301 B2
APPLICATION NO. : 16/302806
DATED : August 3, 2021
INVENTOR(S) : Cornelis J. F. Hosman et al.

It is certified that error appears in the above-identified patent and that said Letters Patent is hereby corrected as shown below:

In the Claims

Column 34, Line 18, Claim 4:
" $\dfrac{\text{Conversion} \times 1.25 + \text{wt \% purge}}{W} \times 100\% \text{ wt,}$ "

Should read:
$\dfrac{\text{Conversion} \times 1.25 + \text{purge}}{W} \times 100\% \text{ wt,}$.

Signed and Sealed this
Thirteenth Day of September, 2022

Katherine Kelly Vidal
*Director of the United States Patent and Trademark Office*